(12) United States Patent
Wieczorek et al.

(10) Patent No.: US 12,370,469 B2
(45) Date of Patent: *Jul. 29, 2025

(54) PERFORATED LAYER COALESCER

(71) Applicant: Cummins Filtration IP, Inc., Columbus, IN (US)

(72) Inventors: Mark T. Wieczorek, Cookeville, TN (US); Joshua Ryan Hendrixson, Smithville, TN (US); Barry Mark Verdegan, Stoughton, WI (US)

(73) Assignee: Cummins Filtration IP, Inc., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/424,502

(22) Filed: Jan. 26, 2024

(65) Prior Publication Data
US 2024/0173650 A1 May 30, 2024

Related U.S. Application Data

(63) Continuation of application No. 17/587,273, filed on Jan. 28, 2022, now Pat. No. 11,911,714, which is a (Continued)

(51) Int. Cl.
*B01D 17/02* (2006.01)
*B01D 17/04* (2006.01)
(Continued)

(52) U.S. Cl.
CPC .......... *B01D 17/045* (2013.01); *B01D 17/02* (2013.01); *B01D 17/04* (2013.01); *B01D 35/30* (2013.01);
(Continued)

(58) Field of Classification Search
CPC .. C02F 1/00; C02F 1/001; C02F 1/004; C02F 2101/30; C02F 2101/301; C02F 2101/302;
(Continued)

(56) References Cited

U.S. PATENT DOCUMENTS 2,689,652 A * 9/1954 Gretzinger ............. B01D 29/21
210/493.4
2,701,062 A  2/1955 Robinson
(Continued)

FOREIGN PATENT DOCUMENTS

CN 1684752 A 10/2005
CN 101185818 A 5/2008
(Continued)

OTHER PUBLICATIONS

Bremond, et al., "Decompressing Emulsion Droplets Favors Coalescence," Physical Review Letters 100(2), 024501, 4 pages (2008).
(Continued)

*Primary Examiner* — Joseph W Drodge
(74) *Attorney, Agent, or Firm* — Foley & Lardner LLP

(57) ABSTRACT

This disclosure generally relates to perforated filter media and coalescing filter elements utilizing perforated filter media. One example coalescing filter element is structured to separate a dispersed phase from a continuous phase of a mixture. The filter media includes a first coalescing layer. The first coalescing layer includes a first filter media. The first filter media has a plurality of pores and a first perforation. Each of the plurality of pores is smaller than the first perforation. The first perforation is formed in the first filter media and extends through the first filter media. The plurality of pores are structured to capture a portion of the dispersed phase. The first perforation is structured to facilitate the transmission of coalesced drops of the dispersed (Continued)

phase through the first coalescing layer such that the coalesced drops of the dispersed phase are separated from the portion of the dispersed phase captured in the first coalescing layer.

18 Claims, 13 Drawing Sheets

Related U.S. Application Data continuation of application No. 16/318,488, filed as application No. PCT/US2017/042832 on Jul. 19, 2017, now Pat. No. 11,247,143.

(60) Provisional application No. 62/364,179, filed on Jul. 19, 2016.

(51) Int. Cl.
  *B01D 29/21* (2006.01)
  *B01D 29/58* (2006.01)
  *B01D 35/30* (2006.01)
  *B01D 36/00* (2006.01)
  *B01D 39/20* (2006.01)
  *B01D 17/00* (2006.01)

(52) U.S. Cl.
  CPC .............. *B01D 17/08* (2013.01); *B01D 29/21* (2013.01); *B01D 29/58* (2013.01); *B01D 36/003* (2013.01); *B01D 39/2017* (2013.01); *B01D 2201/291* (2013.01); *B01D 2201/32* (2013.01); *B01D 2257/702* (2013.01)

(58) Field of Classification Search
  CPC ............ C02F 2101/32; C02F 2101/322; C02F 2103/00; C02F 2103/001; C02F 2103/007; C02F 2103/008; C02F 2103/06; B01D 17/00; B01D 17/02; B01D 17/04; B01D 17/045; B01D 17/08; B01D 29/0095; B01D 29/01; B01D 29/031; B01D 29/07; B01D 29/21; B01D 29/33; B01D 29/333; B01D 29/35; B01D 29/353; B01D 29/56; B01D 29/58; B01D 35/30; B01D 36/003; B01D 39/00; B01D 39/10; B01D 39/12; B01D 39/14; B01D 69/08; B01D 69/10; B01D 71/00; B01D 71/02; B01D 71/022; B01D 2201/00; B01D 2201/12; B01D 2201/127; B01D 2201/29; B01D 2201/291; B01D 2201/298; B01D 2201/301; B01D 2201/307; B01D 2201/32; B01D 2257/702; B01D 2257/704; B01D 39/2017
  USPC ......... 210/335, 338, 435, 450, 493.1, 493.5, 210/488, 489, 498
  See application file for complete search history.

(56) References Cited

U.S. PATENT DOCUMENTS

| | | |
|---|---|---|
| 2,768,752 A * | 10/1956 | Thatcher ................ B01D 27/06 210/493.1 |
| 3,061,917 A | 11/1962 | Pall |
| 3,228,527 A | 1/1966 | McPherson |
| 3,241,681 A | 3/1966 | Pall |
| 3,390,780 A | 7/1968 | Bennett |
| 3,890,123 A | 6/1975 | Kuga |
| 3,934,372 A | 1/1976 | Diehn et al. |
| 3,950,289 A | 4/1976 | D'Amato et al. |
| 3,951,814 A | 4/1976 | Krueger |
| 3,956,534 A | 5/1976 | Brown et al. |
| 3,957,365 A | 5/1976 | Croft |
| 3,960,719 A | 6/1976 | Bresson |
| 3,973,717 A | 8/1976 | Jensen |
| 4,031,261 A | 6/1977 | Durst |
| 4,039,441 A | 8/1977 | Fett |
| 4,047,946 A | 9/1977 | Croft |
| 4,050,237 A | 9/1977 | Pall et al. |
| 4,052,316 A | 10/1977 | Berger et al. |
| 4,078,965 A | 3/1978 | Berger et al. |
| 4,081,373 A | 3/1978 | Rozniecki |
| 4,083,778 A | 4/1978 | McGrew |
| 4,199,447 A | 4/1980 | Chambers et al. |
| 4,210,697 A | 7/1980 | Adiletta |
| 4,213,863 A | 7/1980 | Anderson |
| 4,229,297 A | 10/1980 | Nohmi et al. |
| 4,229,838 A | 10/1980 | Mano |
| 4,241,108 A | 12/1980 | Kern et al. |
| 4,251,369 A | 2/1981 | Casad et al. |
| 4,304,671 A | 12/1981 | Labaquere |
| 4,340,276 A | 7/1982 | Maffitt et al. |
| 4,372,847 A | 2/1983 | Lewis |
| 4,457,845 A | 7/1984 | Robertson |
| 4,553,504 A | 11/1985 | Duggal et al. |
| 4,576,862 A | 3/1986 | Lee et al. |
| 4,578,898 A | 4/1986 | Greenbaum |
| 4,622,821 A | 11/1986 | Madden |
| 4,640,781 A | 2/1987 | Hughes |
| 4,643,834 A | 2/1987 | Batutis |
| 4,756,823 A | 7/1988 | O'Neill et al. |
| 4,759,782 A | 7/1988 | Miller et al. |
| 4,790,947 A | 12/1988 | Arnold |
| 4,863,643 A | 9/1989 | Cochran |
| 4,888,117 A | 12/1989 | Brown et al. |
| 4,954,297 A | 9/1990 | Beery et al. |
| 4,976,993 A | 12/1990 | Sutera |
| 5,006,260 A | 4/1991 | Roques et al. |
| 5,015,376 A | 5/1991 | Picek |
| 5,037,454 A | 8/1991 | Mann |
| 5,062,927 A | 11/1991 | Stout |
| 5,068,035 A | 11/1991 | Mohr |
| 5,080,802 A | 1/1992 | Cairo et al. |
| 5,084,170 A | 1/1992 | Janik et al. |
| 5,112,498 A | 5/1992 | Davies |
| 5,156,745 A | 10/1992 | Cairo et al. |
| 5,174,907 A | 12/1992 | Chown et al. |
| 5,223,031 A | 6/1993 | Sugi et al. |
| 5,242,604 A | 9/1993 | Young et al. |
| 5,244,574 A | 9/1993 | Gatt et al. |
| 5,275,729 A | 1/1994 | Gris |
| 5,320,909 A | 6/1994 | Scharman et al. |
| 5,376,183 A | 12/1994 | Gatt et al. |
| 5,401,404 A | 3/1995 | Strauss |
| 5,401,413 A | 3/1995 | Gatt et al. |
| 5,417,848 A | 5/1995 | Erdmannsdorfer et al. |
| 5,439,588 A | 8/1995 | Chown et al. |
| 5,443,724 A | 8/1995 | Williamson et al. |
| 5,450,835 A | 9/1995 | Wagner |
| 5,454,937 A | 10/1995 | Lewandowski |
| 5,454,945 A | 10/1995 | Spearman |
| 5,468,358 A | 11/1995 | Ohkawa et al. |
| 5,468,382 A | 11/1995 | Cook et al. |
| 5,468,385 A | 11/1995 | Inoue |
| 5,480,547 A | 1/1996 | Williamson et al. |
| 5,494,629 A | 2/1996 | Gorden et al. |
| 5,500,132 A | 3/1996 | Elmi |
| 5,510,112 A | 4/1996 | Gatt et al. |
| 5,562,888 A | 10/1996 | Rajadurai |
| 5,565,078 A | 10/1996 | Sams et al. |
| 5,574,530 A | 11/1996 | Sanada |
| 5,575,896 A | 11/1996 | Sams et al. |
| 5,576,047 A | 11/1996 | Margolis |
| 5,580,692 A | 12/1996 | Lofftus et al. |
| 5,616,244 A | 4/1997 | Seureau et al. |
| 5,622,101 A | 4/1997 | Margolis |
| 5,629,367 A | 5/1997 | Lofftus et al. |
| 5,631,919 A | 5/1997 | Intermill et al. |
| 5,643,431 A | 7/1997 | Sams et al. |

(56) References Cited

U.S. PATENT DOCUMENTS

| | | |
|---|---|---|
| 5,656,166 A | 8/1997 | Linnersten et al. |
| 5,656,173 A | 8/1997 | Jordan et al. |
| 5,667,678 A | 9/1997 | Dye et al. |
| 5,669,366 A | 9/1997 | Beach et al. |
| 5,750,024 A | 5/1998 | Spearman |
| 5,762,810 A | 6/1998 | Pelton et al. |
| 5,800,597 A | 9/1998 | Perrotta et al. |
| 5,837,310 A | 11/1998 | Margolis et al. |
| 5,861,087 A | 1/1999 | Manning |
| 5,874,008 A | 2/1999 | Hirs |
| RE36,173 E | 3/1999 | Margolis |
| 5,879,556 A | 3/1999 | Hein |
| 6,071,300 A | 1/2000 | Brenneman et al. |
| 6,019,717 A | 2/2000 | Herman |
| 6,056,128 A | 5/2000 | Glasgow |
| 6,060,410 A | 5/2000 | Gillberg-Laforce et al. |
| 6,083,380 A | 7/2000 | Selby et al. |
| 6,099,729 A | 8/2000 | Cella et al. |
| 6,123,061 A | 9/2000 | Baker et al. |
| 6,139,595 A | 10/2000 | Herman et al. |
| 6,149,408 A | 11/2000 | Holt |
| 6,171,488 B1 | 1/2001 | Morse et al. |
| 6,251,168 B1 | 6/2001 | Birmingham et al. |
| 6,281,264 B1 | 8/2001 | Salovey et al. |
| 6,290,738 B1 | 9/2001 | Holm |
| 6,302,932 B1 | 10/2001 | Unger et al. |
| 6,312,505 B1 | 11/2001 | McQuigg et al. |
| 6,332,987 B1 | 12/2001 | Whitney et al. |
| 6,337,008 B1 | 1/2002 | Christensen et al. |
| 6,354,283 B1 | 3/2002 | Hawkins et al. |
| 6,358,416 B1 | 3/2002 | Miller et al. |
| 6,413,429 B1 | 7/2002 | Breman et al. |
| 6,416,657 B1 | 7/2002 | Fersing et al. |
| 6,419,721 B1 | 7/2002 | Hunter |
| 6,422,396 B1 | 7/2002 | Li et al. |
| 6,449,947 B1 | 9/2002 | Liu et al. |
| 6,517,615 B2 | 2/2003 | Miller et al. |
| 6,530,978 B2 | 3/2003 | McQuigg et al. |
| 6,533,935 B2 | 3/2003 | Miller et al. |
| 6,534,196 B2 | 3/2003 | Betts |
| 6,540,816 B2 | 4/2003 | Allie et al. |
| 6,544,449 B1 | 4/2003 | Gardner |
| 6,569,330 B1 | 5/2003 | Sprenger et al. |
| 6,579,438 B1 | 6/2003 | Creber et al. |
| 6,582,490 B2 | 6/2003 | Miller et al. |
| 6,601,385 B2 | 8/2003 | Verdegan et al. |
| 6,605,224 B2 | 8/2003 | Aymong |
| 6,610,198 B1 | 8/2003 | Jiang et al. |
| 6,640,792 B2 | 11/2003 | Harvey et al. |
| 6,641,742 B2 | 11/2003 | Prater et al. |
| 6,683,783 B1 | 1/2004 | Smalley et al. |
| 6,716,349 B2 | 4/2004 | Baracchi et al. |
| 6,722,123 B2 | 4/2004 | Liu et al. |
| 6,730,236 B2 | 5/2004 | Kouba |
| 6,740,358 B2 | 5/2004 | Speece et al. |
| 6,749,827 B2 | 6/2004 | Smalley et al. |
| 6,758,980 B2 | 7/2004 | Prater et al. |
| 6,764,598 B2 | 7/2004 | Yu et al. |
| 6,767,459 B1 | 7/2004 | Sinker et al. |
| 6,771,808 B1 | 8/2004 | Wallack |
| 6,811,693 B2 | 11/2004 | Nilsen et al. |
| 6,884,349 B1 | 4/2005 | Jiang |
| 6,907,997 B2 | 6/2005 | Thacker et al. |
| 6,936,233 B2 | 8/2005 | Smalley et al. |
| 6,946,012 B1 | 9/2005 | Miller et al. |
| 6,949,237 B2 | 9/2005 | Smalley et al. |
| 6,979,709 B2 | 12/2005 | Smalley et al. |
| 6,986,876 B2 | 1/2006 | Smalley et al. |
| 7,008,604 B2 | 3/2006 | Smalley et al. |
| 7,041,620 B2 | 5/2006 | Smalley et al. |
| 7,048,262 B2 | 5/2006 | Cheng |
| 7,048,999 B2 | 5/2006 | Smalley et al. |
| 7,071,406 B2 | 7/2006 | Smalley et al. |
| 7,087,207 B2 | 8/2006 | Smalley et al. |
| 7,105,596 B2 | 9/2006 | Smalley et al. |
| 7,108,841 B2 | 9/2006 | Smalley et al. |
| 7,115,150 B2 | 10/2006 | Johnson et al. |
| 7,189,335 B1 | 3/2007 | Dalzell et al. |
| 7,198,718 B1 | 4/2007 | Turnbull |
| 7,205,069 B2 | 4/2007 | Smalley et al. |
| 7,211,226 B2 | 5/2007 | Liu et al. |
| 7,211,320 B1 | 5/2007 | Cooper et al. |
| 7,235,124 B2 | 6/2007 | Liu et al. |
| 7,235,177 B2 | 6/2007 | Herman et al. |
| 7,238,216 B2 | 7/2007 | Malgorn et al. |
| 7,250,126 B2 | 7/2007 | Haberkamp et al. |
| 7,258,719 B2 | 8/2007 | Miller et al. |
| 7,279,319 B2 | 10/2007 | Cheng |
| 7,285,209 B2 | 10/2007 | Yu et al. |
| 7,297,256 B2 | 11/2007 | Loftis et al. |
| 7,297,279 B2 | 11/2007 | Johnson et al. |
| 7,303,735 B2 | 12/2007 | Suchak et al. |
| 7,314,558 B1 | 1/2008 | Jaroszczyk et al. |
| 7,323,106 B2 | 1/2008 | Jaroszczyk et al. |
| 7,326,266 B2 | 2/2008 | Barnwell |
| 7,328,572 B2 | 2/2008 | McKinley et al. |
| 7,354,563 B2 | 4/2008 | Smalley et al. |
| 7,390,477 B2 | 6/2008 | Smalley et al. |
| 7,390,767 B2 | 6/2008 | Smalley et al. |
| 7,406,960 B2 | 8/2008 | Knauf et al. |
| 7,413,588 B2 | 8/2008 | Holzmann et al. |
| 7,416,657 B2 | 8/2008 | Kretchmar |
| 7,419,601 B2 | 9/2008 | Cooper et al. |
| 7,419,624 B1 | 9/2008 | Smalley et al. |
| 7,419,651 B2 | 9/2008 | Smalley et al. |
| 7,473,291 B2 | 1/2009 | Evenstad et al. |
| 7,481,881 B2 | 1/2009 | Okahisa |
| 7,481,989 B2 | 1/2009 | Smalley et al. |
| 7,510,695 B2 | 3/2009 | Smalley et al. |
| 7,527,739 B2 | 5/2009 | Jiang et al. |
| 7,563,368 B2 | 7/2009 | Martin et al. |
| 7,581,558 B2 | 9/2009 | Martin et al. |
| 7,582,130 B2 | 9/2009 | Ng et al. |
| 7,591,279 B2 | 9/2009 | Martin et al. |
| 7,614,390 B2 | 11/2009 | Holzmann et al. |
| 7,632,569 B2 | 12/2009 | Smalley et al. |
| 7,648,543 B2 | 1/2010 | Faber et al. |
| 7,648,565 B2 | 1/2010 | Jiang |
| 7,655,073 B2 | 2/2010 | Evenstad et al. |
| 7,655,302 B2 | 2/2010 | Smalley et al. |
| 7,662,216 B1 | 2/2010 | Terres et al. |
| 7,674,425 B2 | 3/2010 | Schwandt et al. |
| 7,678,169 B1 | 3/2010 | Gwin et al. |
| 7,699,029 B2 | 4/2010 | Herman et al. |
| 7,857,883 B2 | 12/2010 | Scheckel et al. |
| 7,879,388 B2 | 2/2011 | Clarkson et al. |
| 7,887,934 B2 | 2/2011 | Gentleman et al. |
| 7,892,660 B2 | 2/2011 | Gentleman et al. |
| 7,897,271 B2 | 3/2011 | Gentleman et al. |
| 7,901,798 B2 | 3/2011 | Gentleman et al. |
| 7,922,981 B2 | 4/2011 | Hauptmann |
| 7,939,136 B2 | 5/2011 | Smalley et al. |
| 7,939,325 B2 | 5/2011 | Adams et al. |
| 7,977,267 B2 | 7/2011 | Gentleman et al. |
| 8,002,990 B2 | 8/2011 | Schroeder et al. |
| 8,517,185 B2 | 8/2013 | Wieczorek et al. |
| 8,590,712 B2 | 11/2013 | Wieczorek et al. |
| 8,678,202 B2 | 3/2014 | Wieczorek et al. |
| 9,199,185 B2 | 12/2015 | Verdegan et al. |
| 11,247,143 B2 | 2/2022 | Wieczorek et al. |
| 11,857,894 B2 * | 1/2024 | Wieczorek ............. B01D 17/04 |
| 11,911,714 B2 * | 2/2024 | Wieczorek ............. B01D 17/02 |
| 2001/0003082 A1 | 6/2001 | Kahlbaugh et al. |
| 2001/0045162 A1 | 11/2001 | McQuigg et al. |
| 2002/0036163 A1 | 3/2002 | Miller et al. |
| 2002/0046970 A1 | 4/2002 | Murase et al. |
| 2002/0085968 A1 | 7/2002 | Smalley et al. |
| 2002/0090330 A1 | 7/2002 | Smalley et al. |
| 2002/0090331 A1 | 7/2002 | Smalley et al. |
| 2002/0094311 A1 | 7/2002 | Smalley et al. |
| 2002/0098135 A1 | 7/2002 | Smalley et al. |
| 2002/0102196 A1 | 8/2002 | Smalley et al. |
| 2002/0110682 A1 | 8/2002 | Brogan |
| 2002/0115068 A1 | 8/2002 | Tomlinson et al. |

(56) References Cited

U.S. PATENT DOCUMENTS

| | | |
|---|---|---|
| 2002/0119343 A1 | 8/2002 | Betts |
| 2002/0127162 A1 | 9/2002 | Smalley et al. |
| 2002/0127169 A1 | 9/2002 | Smalley et al. |
| 2002/0136681 A1 | 9/2002 | Smalley et al. |
| 2002/0136683 A1 | 9/2002 | Smalley et al. |
| 2002/0150524 A1 | 10/2002 | Smalley et al. |
| 2002/0159943 A1 | 10/2002 | Smalley et al. |
| 2003/0010002 A1 | 1/2003 | Johnson et al. |
| 2003/0045603 A1 | 3/2003 | Salovey et al. |
| 2003/0070424 A1 | 4/2003 | Verdegan et al. |
| 2003/0080446 A1 | 5/2003 | Cheng |
| 2003/0102268 A1 | 6/2003 | Prater et al. |
| 2003/0121858 A1 | 7/2003 | Yu et al. |
| 2003/0158287 A1 | 8/2003 | Salovey et al. |
| 2003/0194513 A1 | 10/2003 | Carlson |
| 2004/0007255 A1 | 1/2004 | Labib et al. |
| 2004/0060858 A1 | 4/2004 | Lucas et al. |
| 2004/0094459 A1 | 5/2004 | Prater et al. |
| 2004/0208841 A1 | 10/2004 | Salovey et al. |
| 2004/0222156 A1 | 11/2004 | Yu et al. |
| 2005/0026526 A1 | 2/2005 | Verdegan et al. |
| 2005/0067724 A1 | 3/2005 | Cheng |
| 2005/0084436 A1 | 4/2005 | Suchak et al. |
| 2005/0221141 A1 | 10/2005 | Hampden-Smith et al. |
| 2005/0233183 A1 | 10/2005 | Hampden-Smith et al. |
| 2005/0233203 A1 | 10/2005 | Hampden-Smith et al. |
| 2005/0247260 A1 | 11/2005 | Shin et al. |
| 2005/0249656 A1 | 11/2005 | Smalley et al. |
| 2005/0260120 A1 | 11/2005 | Smalley et al. |
| 2005/0274257 A1 | 12/2005 | Reznik |
| 2006/0108280 A1 | 5/2006 | Jodi |
| 2006/0137317 A1 | 6/2006 | Bryner et al. |
| 2006/0137318 A1 | 6/2006 | Lim et al. |
| 2006/0153754 A1 | 7/2006 | Hauptmann |
| 2006/0177572 A1 | 8/2006 | Smith et al. |
| 2006/0192504 A1 | 8/2006 | Ardavan et al. |
| 2006/0207234 A1 | 9/2006 | Ward et al. |
| 2006/0213162 A1 | 9/2006 | Jodi |
| 2006/0242933 A1 | 11/2006 | Webb et al. |
| 2006/0283815 A1 | 12/2006 | Wieczorek |
| 2007/0017370 A1 | 1/2007 | Clausen et al. |
| 2007/0021021 A1 | 1/2007 | Verdegan et al. |
| 2007/0028588 A1 | 2/2007 | Varanasi et al. |
| 2007/0039865 A1 | 2/2007 | Jiang et al. |
| 2007/0043158 A1 | 2/2007 | Smalley et al. |
| 2007/0045001 A1 | 3/2007 | Dalzell et al. |
| 2007/0045167 A1 | 3/2007 | Jaroszczyk et al. |
| 2007/0048209 A1 | 3/2007 | Smalley et al. |
| 2007/0062886 A1 | 3/2007 | Rego et al. |
| 2007/0062887 A1 | 3/2007 | Schwandt et al. |
| 2007/0084776 A1 | 4/2007 | Sasur |
| 2007/0107399 A1 | 5/2007 | Schwandt et al. |
| 2007/0131235 A1 | 6/2007 | Janikowski et al. |
| 2007/0131609 A1 | 6/2007 | Ramaswamy et al. |
| 2007/0223019 A1 | 9/2007 | Maeyama |
| 2007/0278004 A1 | 12/2007 | Dalzell et al. |
| 2007/0289915 A1 | 12/2007 | Jiang et al. |
| 2008/0035586 A1 | 2/2008 | Chen et al. |
| 2008/0050618 A1 | 2/2008 | Tanno et al. |
| 2008/0053888 A1 | 3/2008 | Ellis et al. |
| 2008/0063585 A1 | 3/2008 | Smalley et al. |
| 2008/0063588 A1 | 3/2008 | Smalley et al. |
| 2008/0070022 A1 | 3/2008 | Umezu et al. |
| 2008/0089830 A1 | 4/2008 | Smalley et al. |
| 2008/0105629 A1 | 5/2008 | Yang et al. |
| 2008/0107586 A1 | 5/2008 | Smalley et al. |
| 2008/0121026 A1 | 5/2008 | Verdegan |
| 2008/0133018 A1 | 6/2008 | Salovey et al. |
| 2008/0135469 A1 | 6/2008 | Fremont et al. |
| 2008/0163814 A1 | 7/2008 | Kim et al. |
| 2008/0179263 A1 | 7/2008 | Wieczorek et al. |
| 2008/0220148 A1 | 9/2008 | Clarkson et al. |
| 2008/0224100 A1 | 9/2008 | Smalley et al. |
| 2008/0264018 A1 | 10/2008 | Herman |
| 2008/0292498 A1 | 11/2008 | Resch et al. |
| 2008/0302717 A1 | 12/2008 | Terry et al. |
| 2008/0311025 A1 | 12/2008 | Smalley et al. |
| 2009/0004094 A1 | 1/2009 | Smalley et al. |
| 2009/0020465 A1 | 1/2009 | Jiang et al. |
| 2009/0050578 A1 | 2/2009 | Israel et al. |
| 2009/0065419 A1 | 3/2009 | Jiang |
| 2009/0071892 A1 | 3/2009 | Malgorn |
| 2009/0100811 A1 | 4/2009 | Scheckel et al. |
| 2009/0134097 A1 | 5/2009 | Kerfoot |
| 2009/0142837 A1 | 6/2009 | Adams et al. |
| 2009/0146193 A1 | 6/2009 | Rudin |
| 2009/0155566 A1 | 6/2009 | Gentleman et al. |
| 2009/0155609 A1 | 6/2009 | Gentleman et al. |
| 2009/0159512 A1 | 6/2009 | Brattested |
| 2009/0169463 A1 | 7/2009 | Smalley et al. |
| 2009/0178970 A1 | 7/2009 | Stanfel et al. |
| 2009/0188870 A1 | 7/2009 | Schroeder et al. |
| 2009/0191103 A1 | 7/2009 | Hauptmann |
| 2009/0229632 A1 | 9/2009 | Labib et al. |
| 2009/0250402 A1 | 10/2009 | Jiang et al. |
| 2009/0258191 A1 | 10/2009 | Peacock |
| 2010/0006149 A1 | 1/2010 | Gentleman et al. |
| 2010/0006494 A1 | 1/2010 | Scher et al. |
| 2010/0029465 A1 | 2/2010 | Gentleman et al. |
| 2010/0101993 A1 | 4/2010 | Wells et al. |
| 2010/0143620 A1 | 6/2010 | Ajdelsztajn et al. |
| 2010/0147185 A1 | 6/2010 | Gentleman et al. |
| 2010/0151197 A1 | 6/2010 | Gentleman et al. |
| 2010/0151264 A1 | 6/2010 | Gentleman et al. |
| 2010/0213436 A1 | 8/2010 | Khan |
| 2010/0219117 A1 | 9/2010 | Reiland et al. |
| 2010/0252510 A1 | 10/2010 | Godsay et al. |
| 2010/0264401 A1 | 10/2010 | Adivarahan et al. |
| 2010/0320124 A1 | 12/2010 | Zhang et al. |
| 2010/0320440 A1 | 12/2010 | Khan |
| 2011/0005290 A1 | 1/2011 | Norikura |
| 2011/0024941 A1 | 2/2011 | Samluk et al. |
| 2011/0073838 A1 | 3/2011 | Khan et al. |
| 2011/0083583 A1 | 4/2011 | Gentleman et al. |
| 2011/0083736 A1 | 4/2011 | Gentleman et al. |
| 2011/0086200 A1 | 4/2011 | Gentleman et al. |
| 2011/0086754 A1 | 4/2011 | Gentleman et al. |
| 2011/0086781 A1 | 4/2011 | Smalley et al. |
| 2011/0109712 A1 | 5/2011 | Grant et al. |
| 2011/0115102 A1 | 5/2011 | Dema |
| 2011/0124941 A1 | 5/2011 | Verdegan et al. |
| 2011/0147299 A1 | 6/2011 | Stanfel et al. |
| 2011/0168621 A1 | 7/2011 | Wieczorek et al. |
| 2011/0168647 A1 | 7/2011 | Wieczorek et al. |
| 2011/0210081 A1 | 9/2011 | Green et al. |
| 2011/0212525 A1 | 9/2011 | Adams et al. |
| 2011/0259796 A1 | 10/2011 | Chen et al. |
| 2012/0175298 A1 | 7/2012 | Gupta et al. |
| 2014/0007771 A1 | 1/2014 | Chase et al. |
| 2014/0197087 A1 | 7/2014 | Pribanic et al. |
| 2014/0331626 A1 | 11/2014 | Nagy et al. |
| 2015/0182878 A1 | 7/2015 | Bultinck et al. |
| 2015/0209699 A1 | 7/2015 | Morris et al. |
| 2017/0218894 A1 | 8/2017 | Girondi |

FOREIGN PATENT DOCUMENTS

| | | |
|---|---|---|
| CN | 101282773 A | 10/2008 |
| CN | 101687128 A | 3/2010 |
| DE | 43 43 754 A1 | 7/1994 |
| DE | 10 2008 026 485 A1 | 2/2009 |
| GB | 0 825 192 A | 12/1959 |
| RU | 1813498 A1 | 5/1993 |
| RU | 38450 U1 | 6/2004 |
| RU | 39502 U1 | 8/2004 |
| RU | 2371235 C2 | 10/2009 |
| SU | 39502 | 10/1934 |
| SU | 1337536 A1 | 9/1987 |
| SU | 1761201 A1 | 9/1992 |

(56) References Cited

FOREIGN PATENT DOCUMENTS

| | | |
|---|---|---|
| WO | WO-2009/058598 A2 | 5/2009 |
| WO | WO-2010/042706 | 4/2010 |

OTHER PUBLICATIONS

Decision of Grant for Russian App. No. 2013102594/05, dated Apr. 27, 2015, 19 pages (with translation).
Decision of Grant for Russian Patent App. No. 2013102593/05, dated Feb. 18, 2015, 23 pages (with translation).
Delstar Technologies, Inc., "Nets, Nonwovens, & Cores for the Filtration Industry," 2 pages (2009).
Examination Report for Indian Patent App. No. 1513/KOLNP/2011, dated Mar. 8, 2017, 7 pages.
Examination Report for Indian Patent App. No. 2066/KOLNP/2012, dated Sep. 6, 2018, 7 pages.
Examination Report for Indian Patent App. No. 4066/KOLNP/2011, dated Aug. 23, 2017, 5 pages.
Final Office Action for U.S. Appl. No. 12/780,392 dated May 28, 2015, 10 pages.
Foreign Action other than Search Report on DE 112011102094.5 DTD May 25, 2020.
International Search Report and Written Opinion based on PCT/US13/49896, issued Nov. 22, 2013, 11 pages.
International Search Report and Written Opinion for PCT/US2009/059983, dated Dec. 4, 2009, 10 pages.
International Search Report and Written Opinion for PCT/US2010/034922 dated Jan. 24, 2012, 6 pages.
International Search Report and Written Opinion for PCT/US2011/031257 dated Jun. 8, 2011, 14 pages.
International Search Report and Written Opinion for PCT/US2011/031257 dated May 28, 2011.
International Search Report and Written Opinion for PCT/US2011/031259 dated Oct. 28, 2011, 11 pages.
Non-Final Office Action for U.S. Appl. No. 12/247,502, dated Mar. 24, 2011, 14 pages.
Non-Final Office Action for U.S. Appl. No. 12/780,392 dated Nov. 17, 2014, 11 pages.
Non-Final Office Action for U.S. Appl. No. 12/780,392, dated Apr. 9, 2013, 44 pages.
Non-Final Office Action for U.S. Appl. No. 12/780,392, dated Jul. 17, 2013, 9 pages.
Non-Final Office Action for U.S. Appl. No. 12/820,784, dated Nov. 26, 2012, 13 pages.
Non-Final Office Action for U.S. Appl. No. 12/820,791, dated Aug. 23, 2012, 44 pages.
Non-Final Office Action for U.S. Appl. No. 13/875,589, dated Oct. 7, 2013, 26 pages.
Non-Final Office Action on U.S. Appl. No. 17/590,283 Dtd Apr. 5, 2023.
Office Action for Brazilian Patent App. No. BR112012019395-3, dated Jan. 28, 2019, 9 pages (with translation).
Office Action for Brazilian Patent App. No. BR112012019483-6, dated Jan. 28, 2019, 9 pages (with translation).
Office Action for Chinese Patent App. No. 2009801395617, dated May 20, 2013, 20 pages (with translation).
Office Action for Chinese Patent App. No. 201080021992.6 dated Nov. 1, 2013, 17 pages (with translation).
Office Action for Chinese Patent App. No. 201080021992.6, dated Dec. 9, 2014, 12 pages (with translation).
Office Action for Chinese Patent App. No. 2011800303530, dated Apr. 18, 2014, 69 pages (with translation).
Office Action for Chinese Patent App. No. 201510530266.1, dated Dec. 28, 2016, 18 pages (with translation).
Office Action for Chinese Patent App. No. 201510982406.9, dated Apr. 18, 2018, 11 pages (with translation).
Office Action for Chinese Patent App. No. 201510982406.9, dated Oct. 25, 2017, 10 pages (with translation).
Office Action for German Patent App. No. 11 2009 002 121.2, dated Jan. 28, 2016, 10 pages (with translation).
Office Action for German Patent App. No. 11 2009 002 121.2, dated Oct. 16, 2018, 8 pages (with translation).
Office Action for German Patent App. No. 112010002027.2 dated Aug. 1, 2019, 8 pages (with translation).
Office Action for German Patent App. No. 112011102095.3 dated Dec. 13, 2019, 9 pages (with translation).
Office Action for Indian Patent App. No. 1646/KOLNP/2012, dated Oct. 1, 2018, 7 pages.
Official Action for Russian Patent App. No. 2015124044, dated Dec. 15, 2017, 9 pages (with translation).
Third Office Action on Chinese Patent Application No. 201780044485.6, dtd Aug. 18, 2021.
Woo, "Focus: To Merge, Drops Must Separate," Physical Review Focus 21(2), 4 pages (2008).

\* cited by examiner

PERFORATED LAYER COALESCER

CROSS-REFERENCE TO RELATED APPLICATIONS

The present application is a continuation of U.S. patent application Ser. No. 17/587,273, filed Jan. 28, 2022, which a continuation of U.S. patent application Ser. No. 16/318,488, filed Jan. 17, 2019, now U.S. Pat. No. 11,247,143, which is a national stage of PCT Application No. PCT/US2017/042832, filed Jul. 19, 2017, which claims priority to U.S. Provisional Patent Application No. 62/364,179, entitled "Perforated Layer Coalescer" and filed Jul. 19, 2016. The contents of these applications are incorporated herein by reference.

TECHNICAL FIELD

The present application relates to coalescing filter elements.

BACKGROUND

Mixtures may include two immiscible constituents in various applications. For example, a mixture may have a continuous phase and a dispersed phase. Common mixtures include water and fuel (e.g., diesel, kerosene, gasoline, etc.), oil and water, water and air, oil and air, water and natural gas, and oil and natural gas. In many applications, it is desirable to separate the dispersed phase from the continuous phase. For example, the separation of the dispersed phase from the continuous phase is important in many industrial, commercial, and residential applications. In one application, removal of water (i.e., the dispersed phase) from fuel (i.e., the continuous phase) is important in fuel filtration for internal combustion engines because the water may cause corrosion of components within the internal combustion engines. One way to achieve the separation is to filter the mixture through a coalescing filter element (referred to as a "coalescer"). In many applications, including fuel-water separation, coalescers are used to achieve high contaminant (e.g., water droplets from fuel) removal. Some fuels (e.g., biodiesel fuel, etc.) have a relatively high surfactancy and/or poor water separability. In applications where these fuels are utilized, it is even more difficult to remove water from the fuel.

Unlike particulate filters, coalescing filters (e.g., coalescers, etc.) are intended to capture and remove the dispersed phase from the continuous phase and to drain the dispersed phase from the coalescing filter media (e.g., filter media, etc.), not accumulate it indefinitely as done in typical particulate filters. In other words, drainage of the dispersed phase from the coalescing filter media is not a function of particulate filter construction and configuration in conventional designs.

In the absence of solid contaminant, coalescers can achieve a steady state whereby the rate of dispersed phase entering the filter media equals the rate at which it is drained or released. The relative amount of contaminant held by the coalescing filter media is expressed as its "saturation." Saturation is defined as the relative amount of the filter media's void volume occupied by the captured dispersed phase. The filter media void volume is the relative volume of the filter media unoccupied by fibers or other structures that collect contaminant. The filter media solidity is the relative volume of the filter media occupied by fibers or other structures that collect contaminant. The filter media void volume is numerically equal to one-hundred minus the solidity of the media, where both void volume and solidity are expressed as percentages. An increase in saturation corresponds to an increase in pressure drop resulting in decreased filter life. Increasing the drainage rate of the dispersed phase from the filter media decreases saturation and pressure drop. Accordingly, achieving high efficiency separation of the dispersed phase through a coalescer can result in undesirable tradeoffs in filtration system performance (e.g., elevated pressure drop, decreased filter life, etc.), which may affect the performance of the system receiving the filtered fluid (e.g., an internal combustion engine).

There is a global demand for high efficiency fuel water separators ("FWS") that use coalescers to remove water from fuel. Some filtration systems achieve high removal efficiency with reduced pressure drop through the use of multi-stage coalescing filters. However, multi-stage coalescing filters can be prohibitively expensive and generally take up more space than single-stage coalescing filters. Multi-layer coalescing filter media are also used in FWS applications. For multilayer filter media and multistage particulate filters and coalescers, it is common for certain filter media layers (e.g., stages, etc.) to accumulate water more rapidly than others, which negatively impacts filter life.

SUMMARY

Various example embodiments relate to perforated filter media and coalescing filter elements comprising the perforated filter media. A coalescing filter element is structured to separate a dispersed phase from a continuous phase of a mixture. The filter media includes a first coalescing layer. One such example embodiment relates to filter media. The first coalescing layer includes a first filter media. The first filter media has a plurality of pores and a first perforation. Each of the plurality of pores is smaller than the first perforation. The first perforation is formed in the first filter media and extends through the first filter media. The plurality of pores are structured to capture a portion of the dispersed phase. The first perforation is structured to facilitate the transmission of coalesced drops of the dispersed phase through the first coalescing layer such that the coalesced drops of the dispersed phase are separated from the portion of the dispersed phase captured in the first coalescing layer. The filter media may be part of a coalescing filter element structured to separate the dispersed phase from the mixture. The coalescing filter element includes the first filter media positioned between a first end plate and a second end plate.

One implementation relates to a fuel water separator that includes a housing and a coalescer filter element. The housing defines an internal volume, the internal volume receiving a mixture of fuel and water. The coalescer filter element is positioned within the internal volume. The coalescer filter element includes a top endplate, a bottom endplate, and a first filter media. The top endplate defines a central channel that receives the mixture. The bottom endplate is located opposite the top endplate. The first filter media is coupled to the top endplate and the bottom endplate. The first filter media includes a first end, a second end, and a perforation. The first end is positioned proximate the top endplate. The second end is opposite the first end. The perforation is positioned proximate the second end. The perforation facilitates transmission of water separate from fuel from within the central channel out of the coalescer filter element.

Another implementation relates to a coalescing filter element that includes a first endplate, a second endplate, a pleated filter media, a first layer of filter media, a tube, and a filter element. The pleated filter media is coupled to the first endplate and the second endplate. The first layer of filter media is coupled to the first endplate and the second endplate. The first layer of filter media is positioned downstream of the pleated filter media. The tube is coupled to the first endplate and the second endplate. The tube is positioned downstream of the first layer of filter media. The tube includes a perforation. The filter element is coupled to the first endplate and the second endplate. The filter element is positioned downstream of the tube.

Yet another implementation relates to a coalescing filter element that includes a first endplate, a second endplate, a pleated filter media, a tube, a first layer of filter media, and a second layer of filter media. The pleated filter media is coupled to the first endplate and the second endplate. The tube is coupled to the first endplate and the second endplate. The tube is positioned downstream of the pleated filter media. The first layer of filter media is coupled to the first endplate and the second endplate. The first layer of filter media is positioned downstream of the tube. The second layer of filter media is coupled to the first endplate and the second endplate. The second layer of filter media is positioned downstream of the first layer of filter media and separated from the first layer of filter media by a gap.

Yet another implementation relates to a fuel water separator that includes a housing and a coalescer filter element. The housing defines an internal volume. The internal volume receives a mixture of fuel and water. The coalescer filter element is positioned within the internal volume. The coalescer filter element includes a top endplate, a bottom endplate, and a first filter media. The top endplate defines a central channel that provides fuel out of the coalescer filter element. The bottom endplate is located opposite the top endplate. The bottom endplate defines an opening that provides water out of the coalescer filter element. The first filter media is coupled to the top endplate and the bottom endplate. The first filter media receives a mixture from between the housing and the first filter media. The first filter media includes a first end, a second end, and a perforation. The first end is positioned proximate the top endplate. The second end is opposite the first end. The perforation is positioned proximate the second end. The perforation facilitates transmission of water separate from fuel out of the coalescer filter element from the opening in the bottom endplate.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
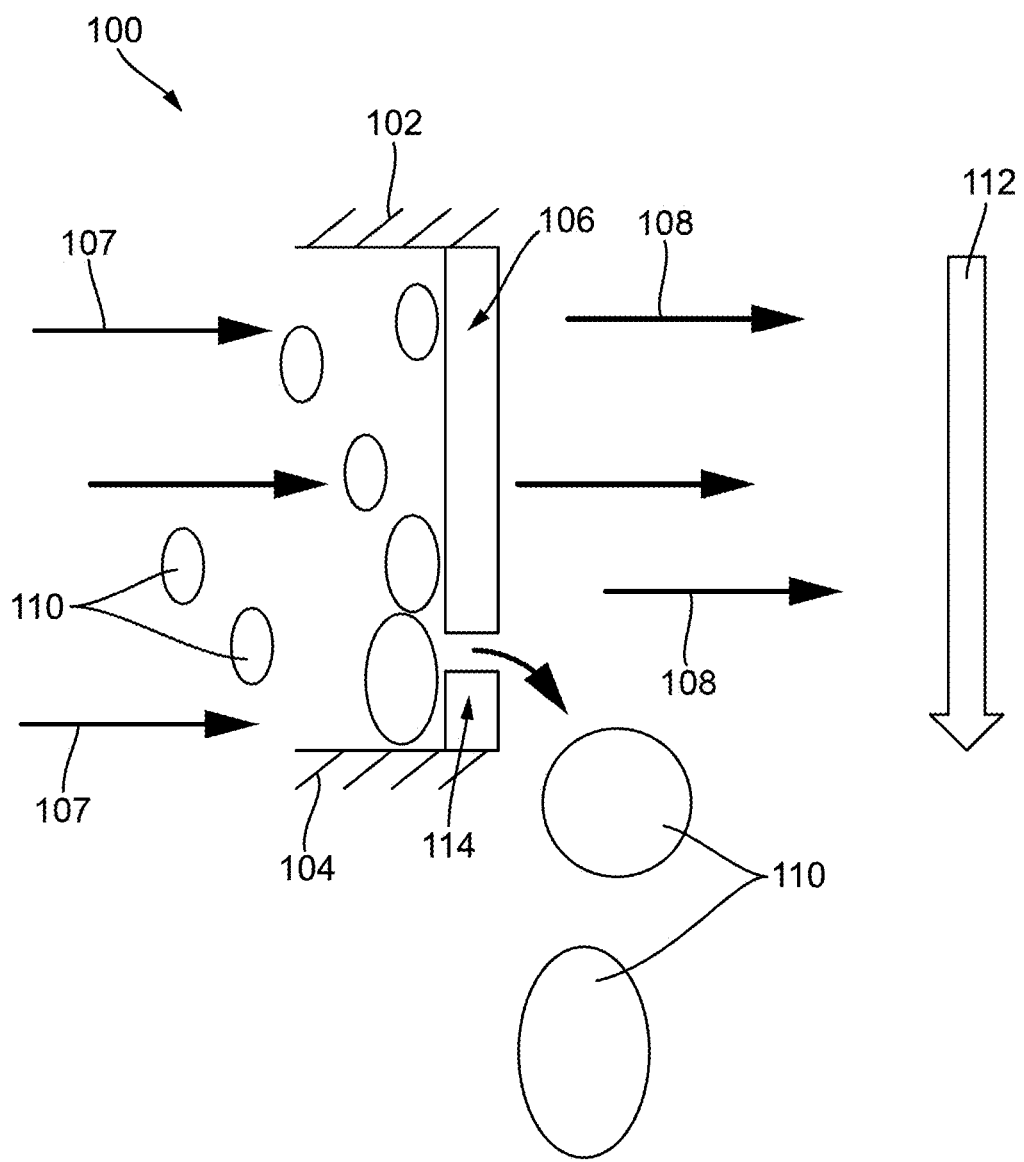
FIG. 1 shows a cross-sectional view of a filter element according to an example embodiment.

Referring to the figures generally, various coalescing filter media (e.g., filter media, etc.) having perforations are described. The coalescing filter media is generally described herein as "filter media." The filter media is structured to separate a dispersed phase from a continuous phase of a mixture. In various embodiments described herein, the filter media is implemented within a FWS and structured to separate water (e.g., a dispersed phase, etc.) from a fuel (e.g., a continuous phase, etc.) within a fuel water mixture. However, the filter media may also be implemented in other applications where separation of a dispersed phase from a continuous phase is desirable. For example, the filter media may be implemented in a crankcase to facilitate crankcase ventilation to separate oil and water droplets from blowby gas, in an oil (e.g., lube, hydraulic oil, etc.) circulation system to separate water from the oil, and in a natural gas system to remove water or oil mist from natural gas.

The coalescing filter media is a perforated filter media that includes a number of holes (e.g., perforations) arranged in a geometric or random pattern to enhance removal of the dispersed phase from the mixture. The filter media may be woven (e.g., sieve, screen, etc.) or nonwoven. In some arrangements, the filter media is polymeric. The holes or perforations may be arranged in a geometric pattern near a bottom endplate of the filter element with respect to the direction of gravity (e.g., at the bottom-half of the filter element). For example, the geometric pattern may include one or more linear rows oriented approximately normal with respect to gravity. In this example, the holes in adjacent rows may be circumferentially or horizontally offset from one another, as in a staggered array.

The perforated filter media may be used as the filter media in a coalescing filter element. The perforated filter media may be used individually, or as a layer in a multimedia or multilayer filter media with any combination and number of perforated and unperforated layers. In some arrangements where the perforated filter media is a layer in a multimedia or multilayer filter media, a gap or space may exist between the perforated layer and the filter media layer immediately upstream of the perforated filter media. In some arrangements, the filter element can be implemented with a non-perforated filter media layer downstream of a perforated filter media layer. In arrangements where a gap or space exists, the gap may be a variable gap such that the gap can be present at some areas between the layers and not present at other areas between the layers. In some arrangements, the perforated layer is the downstream-most layer in a multi-layer configuration.

As described herein, a FWS is a subset (e.g., a particular type, etc.) of a filter. A FWS can include a single-stage, barrier type, water separator or a fuel-water coalescing filter. The FWS may include features different from other filters described herein. For example, the FWS described herein provides a draining function that the filter described herein does not so provide.

Referring to FIG. 1, a cross-sectional view of a filter element 100 is shown according to an example embodiment. The filter element 100 includes a first endplate 102, a second endplate 104, and filter media 106. In some arrangements, the filter element 100 is a cylindrical filter element. In other arrangements, the filter element 100 can be arranged as a panel filter element, a flatsheet filter element, or the like. The filter element 100 may be, for example, a fuel filter element, an oil filter element, an air filter element, a crankcase ventilation filter element, a water filter, or the like.

The filter media 106 is coalescing filter media. The filter media 106 is structured to separate two immiscible phases of a mixture 107 (represented by the flow arrows of FIG. 1 upstream of the filter media 106): a continuous phase 108 (primarily represented by the flow arrows of FIG. 1 downstream of the filter media 106) and a dispersed phase 110 (represented by the round or oval dots of FIG. 1). In FIG. 1, it is understood that, while the flow arrows downstream of the filter media 106 represent the continuous phase 108, some of the dispersed phase 110 may be entrained therewith. In some arrangements, the continuous phase 108 is fuel or lubricant and the dispersed phase 110 is water. Accordingly, as the mixture passes through the filter media 106, the dispersed phase 110 is captured and coalesced by the filter media 106. The coalesced dispersed phase 110 falls along the filter media 106 in the direction of gravity 112. As the coalesced dispersed phase 110 falls, the coalesced dispersed phase 110 may or may not contact the filter media 106.

The filter media 106 may be, for example, a porous filter media, such as a nonwoven fabric, a woven filter media, an extruded screen, or the like. In some arrangements, the filter media 106 is a square weave screen that has a uniform (e.g., well-defined, consistent, etc.) pore size. For example, the filter media 106 may be a screen with thirty percent (30%) open area and squares with fifty (50) micron ("μm") sides, made from monofilament polyester or nylon fibers. In another example, the filter media 106 may be a square weave screen with a thirty-one percent (31%) open area and fifty-five (55) μm sides. In other arrangements, the filter media 106 includes extruded mesh which has a uniform pore size. In further arrangements, the filter media 106 includes nonwoven filter media having a broader pore size distribution than extruded mesh filter media, such as spun-bond and melt blown nonwoven filter media, microglass filter media, and/or cellulose filter media. The filter media 106 may be hydrophobic such that water (i.e., the dispersed phase 110 in the arrangements) tends to accumulate on its upstream face or surface. In other arrangements, the filter media 106 is hydrophilic or has intermediate wetting characteristics. The filter media 106 may also be polymeric filter media.

In an example embodiment, the filter media 106 includes one or more perforations 114. The perforations 114 are created by incorporating holes into an unperforated layer of filter media. The perforations 114 may be produced as the filter media 106 is produced or processed, or added later when the filter media 106 is formed into the final filter element or formed by creating gaps or openings in an otherwise continuous sheet of filter media. In this way, the filter media 106 is textured. The perforations 114 facilitate the drainage of the coalesced dispersed phase 110 through the filter media 106. In some embodiments, the perforations 114 are omitted from the filter media 106.

The perforations 114 are large relative to the pore size distribution of the filter media 106. In some arrangements, the perforations 114 are greater than or equal to one-hundred and fifty (150) μm in diameter (or other opening dimension). In some arrangements, the perforations 114 are greater than or equal to two-hundred (200) μm in diameter (or other opening dimension). In further arrangements, the perforations 114 are greater than or equal to five-hundred (500) μm in diameter (or other opening dimension). In still further arrangements, the perforations 114 are greater than or equal to one-thousand (1,000) μm in diameter (or other opening dimension). For example, the perforations 114 may have a diameter (or other opening dimension) between one-thousand one-hundred (1,100) μm and one-thousand six-hundred (1,600) μm. When the diameter (or other opening dimension) of the perforations 114 is on the order of one-thousand one-hundred (1,100) μm or less, the perforations 114 may be formed by a laser where removed material is substantially vaporized or burned off thereby simplifying the manufacturing process associated with the perforations 114. In another example, the perforations 114 have a diameter (or other opening dimension) of three-thousand (3,000) μm. While the diameter of the perforations 114 has been described herein, the perforations 114 may be non-circular, and the dimension of a perforation 114 may instead be a length of a side of the perforation 114, a distance between vertices of sides of the perforation 114, or other similar measurement. The diameter of the perforations 114 may be determined using, among other methods and mechanisms, an optical or electron microscope (e.g., microscopy, etc.), or calculated from bubble point data as described in ASTM F-316-03 Standard Test Methods for Pore Size Characteristics of Membrane Filters by Bubble Point and Mean Flow Pore Test.

In some arrangements, the bubble point of the filter media 106 in 2-propanol as per ISO 2942 "Hydraulic fluid power—Filter elements—Verification of fabrication integrity and determination of first bubble point" (2004) is less than 1.5 inches of water, less than 0.7 inches of water, and less than 0.3 inches of water. In some arrangements, a steady stream of bubbles is observed from multiple locations at applied air pressures of 1.5 inches of water, 0.7 inches of water, and 0.3 inches of water when the filter media 106, either as a flat sheet, pleat pack or filter element is tested using a bubble point apparatus and 2-propanol as described in ISO 2942. The bubble point of the filter media 106 is specifically selected such that pores within the filter media 106 are distinguished from the perforations 114 such that the coalesced dispersed phase 110 may be removed though the perforations 114. Flow restriction across the perforations 114 is relatively low, compared to flow restriction across the pores in the filter media 106, such that the flow of the coalesced dispersed phase 110 through the perforations 114 is not substantially impeded. The desirable bubble point of the filter media 106 may result when the perforations 114 have a diameter (or other opening dimension) between one-hundred (100) and two-hundred (200) microns.

In an example embodiment, the filter media 106 is capable of removing up to, and including, ninety-nine percent of the coalesced dispersed phase 110 from the mixture 107. Equation 1 sets forth a relationship that is useful for determining bubble points associated with filter media 106 that is capable of such removal of the dispersed phase 110.

$$3.2 = \frac{B_1}{B_2} \quad (1)$$

In Equation 1, $B_1$ is the first bubble point of an unperforated portion of the filter media 106 and $B_2$ is the bubble point of a perforated portion of the filter media 106. This relationship between the unperforated portion of the filter media 106 and the perforated portion of the filter media 106 may be obtained by varying the number and/or diameter (or other opening dimension) of the perforations 114.

In some arrangements, the perforations 114 are positioned, spaced, and/or arranged in an identifiable location (e.g., near the top or bottom end of the filter element 100, etc.) or in a geometric pattern (e.g., one or more linear rows oriented approximately normal with respect to gravity 112, etc.). In other arrangements, the perforations 114 are randomly arranged across at least a portion of the filter media 106. In further arrangements, the perforations 114 are arranged in adjacent rows that are circumferentially or horizontally offset from one another (e.g., as in a staggered array). When the dispersed phase is more dense than the continuous phase, the perforations 114 may be positioned in the bottom half of the filter media 106 (with respect to the direction of gravity 112) near the second endplate 104. In alternate arrangements, the perforations 114 may be positioned above the mid-point of the filter media 106 (with respect to the direction of gravity 112) (e.g., in arrangements where the filter media is an intermediate layer in a multi-layer coalescer or when the dispersed phase 110 is less dense than the continuous phase 108).

The term "perforation" refers to an opening in the filter media that may have a cross-section of any target shape. For example, a perforation may be round in cross-section, irregularly shaped, a slot, a slit, or puncture of another shape as previously defined. The term "perforations" refers to the larger openings in the filter media 106 that serve the primary purpose of permitting the coalesced dispersed phase 110 to drain through the filter media 106, while the term "pores" refers to the smaller openings that capture the fine dispersed phase 110 in the mixture and are present in any unperforated filter media layers (e.g., as described below with respect to FIGS. 2A through 2F). However, it should be understood that a small amount of coalesced dispersed phase 110 may also drain through the pores just as a small amount of the fine dispersed phase 110 may be captured by the perforations 114. The perforations 114 in the filter media 106 may be produced, for example, by puncturing filter media with needles, puncturing filter media using a rotating spoked or star wheel, making slits of short length with a (flat) bladed object, burning holes in the media with an infrared laser, ultrasonic wave, using water jets, melting filter media using hot pins, using a length of filter media 106 that is shorter than the distance between the first endplate 102 and the second endplate 104, or other device(s)/means.

As described in further detail below with respect to FIGS. 8A through 8G, although the filter media 106 is shown as being the only layer in the filter element 100 with respect to FIG. 1, the filter media 106 may be used in combination with other layers of filter media, as a composite filter media, or in conjunction with other filter/separator stages. In multi-layer arrangements, there may be one or more gaps or spaces between a perforated layer of filter media and the other layer of filter media immediately upstream of the perforated layer. These gaps may be formed between the perforated layer of filter media and the other layer of filter media even if a portion of the perforated layer of filter media is in contact with (or otherwise bonded to) a portion of the other layer of filter media. In these instances, the gaps may be non-uniform (e.g., there may be varied spacing between the perforated layer of filter media and the other layer of filter media, etc.). In some other multi-layer arrangements, the other layer of filter media is downstream of the perforated layer and there may be one or more gaps or spaces between the perforated layer of filter media and the other layer of filter media. These gaps may facilitate removal of the dispersed phase and may assist in distinguishing the pores in the filter media 106 from the perforations 114. In some arrangements, the maximum separation between the two layers of filter media is greater than zero (0) μm. In such arrangements, the maximum separation distance may be greater than one (1) μm. In further arrangements, the maximum separation distance may be greater than one-hundred (100) μm. In some arrangements, the gap is varied between zero (0) and one-thousand (1,000) μm. In other arrangements, the gap is varied between zero (0) and one-hundred (100) μm. In further arrangements, the maximum separation between the two layers is less than five-thousand (5,000) μm. In still further arrangements, the maximum separation between the two layers is less than three-thousand (3,000) μm. In further arrangements, the maximum separation between the two layers is less than one-thousand (1,000) μm. In such arrangements, the downstream-most layer in the multilayer configuration is a perforated layer of filter media, and the upstream layers can be perforated or non-perforated.

Figure 2A:
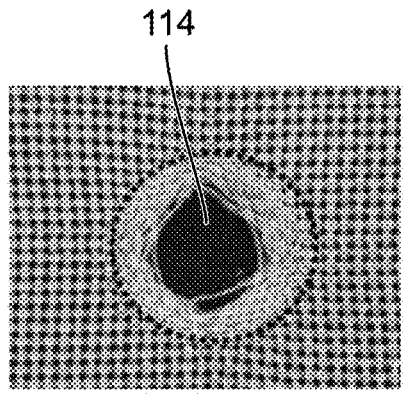
FIGS. 2A, 2B, 2C, 2D, 2E, and 2F each show a micrograph of a filter media having at least one perforation.
Figure 2B:
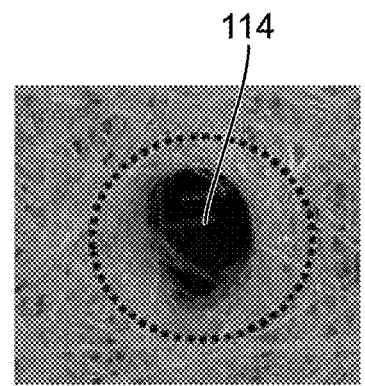
Figure 2C:
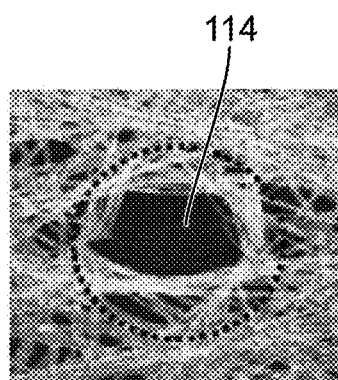
Figure 2D:
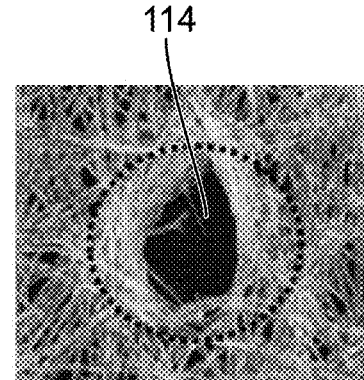
Figure 2E:
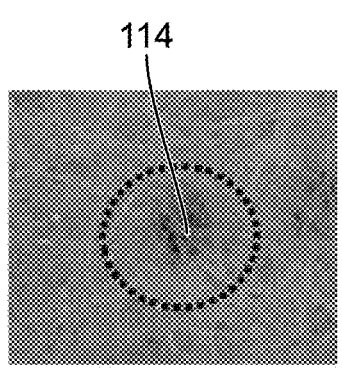
Figure 2F:
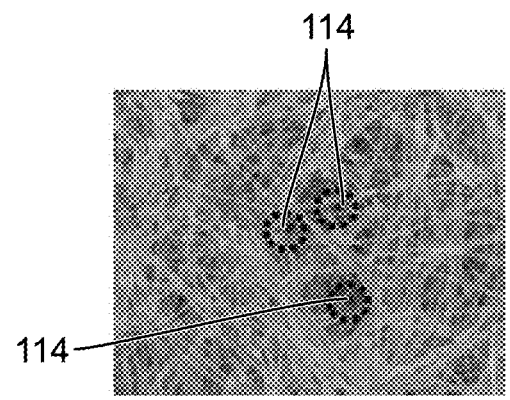

Referring to FIGS. 2A through 2F, micrographs showing magnified views of perforations 114 created in different types of filter media 106 are shown. The magnified views of FIGS. 2A through 2F are shown at one-hundred (100) times magnification. FIG. 2A shows a perforation 114 in polymeric woven screen filter media. FIG. 2B shows a perforation 114 in polymeric nonwoven filter media. FIG. 2C shows a perforation 114 in another polymeric nonwoven filter media. FIG. 2D shows a perforation 114 in a further nonwoven polymeric filter media. FIG. 2E shows a perforation 114 in a further nonwoven filter media. FIG. 2F shows a plurality of perforations 114 in another nonwoven filter media. The perforations 114 of FIGS. 2A, 2B, 2C, and 2D have a diameter of five-hundred (500) μm. Other diameters are also possible. Each of the perforations 114 of FIGS. 2A through 2D are created by punching holes in the filter media using non-barbed needle-like devices. Other mechanisms for creating the perforations 114 can also be utilized.

The perforations 114 of FIGS. 2A, 2B, 2C, and 2D are relatively open and essentially unblocked by fibers, threads, or other extraneous material of the media and thus are clearly visible. In the case of the filter media shown in FIGS.

2E and 2F, barbed needles having diameters of approximately five-hundred (500) μm and seventy-five (75) μm, respectively, were used to create the perforations 114. The barbed needles displace and orient some of the fiber in a vertical direction (i.e., normal to the plane of the figure). As the barbed needle is pulled from the filter media, the needle pulls fibers along with it and partially refills the perforations 114 with fibers oriented in a more vertical direction. In each of the arrangements, the number of perforations 114 per unit area of filter media (i.e., the perforation density) is selected to be high enough that the rate of water accumulation by the coalescer does not exceed the drainage rate through the perforations 114.

Referring again to FIG. 1, as the mixture flows through the filter element 100, the dispersed phase 110 and the continuous phase 108 are transported to the filter media 106 where dispersed phase 110 droplets are captured. As captured droplets of the dispersed phase 110 accumulate, the droplets coalesce and grow in size. The accumulation of the dispersed phase 110 in the filter media 106 increases the restriction across the filter media 106. The captured droplets of the dispersed phase 110 tend to be moved in the direction of gravity 112 (e.g., parallel to the surface or face of the filter media 106). In some arrangements, the captured droplets of the dispersed phase 110 are moved by drag forces from the flowing continuous phase 108. Accordingly, the coalesced dispersed phase 110 accumulates in a lower portion (with respect to the direction of gravity 112) of the filter element 100 when the dispersed phase 110 is more dense than the continuous phase 108 (e.g., as in fuel-water separation), which can contribute to increased pressure drop.

As described above, in some arrangements, the perforations 114 of the filter media 106 are located at the lower portion of the filter media 106 so as to minimize the accumulation of the captured dispersed phase 110. In some arrangements, placing the perforations 114 at the lower portion of the filter media also ensures that the coalesced dispersed phase 110 drops are released in downstream portions of the filter element 100 where fluid velocity and turbulence are low. The placement of the perforations 114 in the lower portion (with respect to the direction of gravity 112) of the filter media 106 and away from the filter's clean fluid outlet, ensures that coalesced drops of the dispersed phase 110 are not broken up by turbulence of the fluid flow downstream of the filter media 106 thereby facilitating removal by settling of the dispersed phase 110. In other arrangements, such as where the perforated layer is an intermediate layer where coalesced dispersed phase movement parallel to the media surface is limited, the perforations 114 are located where the coalesced dispersed phase collects, such as just above a bond point in the filter media or just above a support rib that restricts coalesced dispersed phase drainage.

As noted above, the perforations 114 are significantly larger than the pores of the filter media 106. Since the perforations 114 are larger than the mean flow pore size, there is preferential flow towards and through the perforations 114 compared to the rest of the pores of the filter media 106. For example, the perforations 114 each have a diameter that is at least three times a mean flow pore size of the filter media 106. In another example, the perforations 114 each have a diameter that is at least five times a mean flow pore size of the filter media 106. In yet another example, the perforations 114 each have a diameter that is at least ten times a mean flow pore size of the filter media 106.

The preferential flow supplements gravity 112 in transporting the dispersed phase 110 towards the perforations 114. The net result is that the amount of captured dispersed phase 110 near the perforations 114 is increased relative to the rest of the filter media 106, which produces a localized increase in the rate of coalescence. Coalesced dispersed phase 110 drops pass through the perforations 114 and exit as enlarged drops that are large enough to be removed from the mixture by settling, or by a downstream water barrier such as a hydrophobic media or screen. The continuous phase 108 (e.g., fuel from a fuel water mixture) continues to flow to its intended destination (e.g., engine fuel injectors).

It is counterintuitive that adding the perforations 114 to the filter media 106 would enhance separation and overall performance because it is well known that small holes or leaks in particulate filters decreases removal, notably at larger particle sizes. In fact, ISO 2942 uses the presence of holes to identify filter element fabrication defects. However, in the filer media 106, the perforation diameter, the density of the perforations 114, Frazier permeability, and the perforation locations are controlled such that any minimal amount of the emulsified dispersed phase 110 passing through the perforations 114 is offset by overall increased removal of the dispersed phase 110. The perforations 114 are designed to accumulate and coalesce the dispersed phase 110. Dispersed phase 110 accumulation in and near the perforations 114 prevents emulsified dispersed phase 110 droplets from passing through the perforations 114 and ensures that enlarged coalesced drops of the dispersed phase 110 emerge from the perforations 114.

By minimizing the accumulation of the dispersed phase 110 within and on the perforated filter media 106 layer, the perforations 114 provide a further benefit by decreasing the interstitial velocity within the filter media 106 layer and enabling larger drops of the dispersed phase 110 to form and be released. Thus, the perforations 114 enhance performance by: (1) reducing the restriction caused by the excessive buildup of captured dispersed phase 110, (2) providing localized collection or concentration points for captured dispersed phase 110, (3) increasing the size of coalesced drops of dispersed phase 110 released from the filter media 106, (4) minimizing the breakup of released coalesced drops of dispersed phase 110 into smaller droplets, and (5) enhancing overall removal efficiency of the filter media 106.

The perforation diameter, density of the perforations 114, Frazier permeability, and perforation locations are important factors in increasing the efficiency of the filtration system. The size and number of perforations 114 can vary depending on application requirements. As discussed in further detail below, in some arrangements, the perforations 114 may particularly be located in areas of the filter media 106 with expected low downstream flow rate in order to reduce the drag force on drops of coalesced dispersed phase 110 exiting the perforations 114, thus reducing the breakup of the coalesced drops of dispersed phase 110, which would cause the dispersed phase 110 to remain entrained in the continuous phase 108.

The size of the perforations 114 impacts the size of the coalesced drops of dispersed phase 110 released from the downstream side of the filter media 106 surface. The size of these drops is a function of interfacial tension, the diameter of the perforation 114, and magnitude of the drag force acting on the drop as it forms. As interfacial tension and perforation diameter increase, the size of released drops also increases. This affects removal because larger drops are easier to separate than smaller drops. In practice, released drops will be smaller due to drag forces from flowing continuous phase 108 and other effects. The magnitude of these drag forces in a FWS varies depending upon the location of a perforation 114 in the context of the filter element 100 structure. As such, larger perforations 114 may be utilized in higher velocity regions of a FWS, or a perforation diameter large enough to serve in the most challenging locations may be used.

In some arrangements, it is desirable to maximize the size of coalesced dispersed phase 110 drops emerging from the perforations 114. Turbulence within the perforations 114 can result in the break up or re-emulsification of coalesced dispersed phase. Turbulence is a function of media face velocity ($\mu$; kg m$^{-1}$ s$^{-1}$), perforation diameter (d; μm), and perforation density (D; number of perforations 114 per square meter). Equation 2 sets forth a relationship that is useful for defining desirable conditions for perforated coalescer design.

$$R_H = \frac{k\rho V}{\mu \pi d D} \quad (2)$$

In Equation 2, k is equal to $4 \times 10^6$ μm m$^{-1}$ and $R_H$ is the hypothetical Reynolds number for a condition in which all fluid flow passes through the perforations 114 and no flow passes through the filter media pores. During its useful life, most of the flow through a coalescer media passes through the pores in the filter media and this condition is not normally met in actual practice. For coalescer filter media without perforations 114, the pores are so small and numerous that turbulence is not a concern. For perforated coalescers, however, turbulence may occur under conditions when the value of dD is excessively small.

$R_H$, as defined in Equation 2, is useful for defining the properties and design limits for perforated coalescer filter media. In some arrangements, value of $R_H$ is less than about six-thousand (6,000). In further arrangements, the value of $R_H$ is less than four-thousand (4,000). In further arrangements, the value of $R_H$ is below two-thousand (2,000) in order to minimize coalesced dispersed phase break up. For a given set of fluid and flow conditions, a limiting value of dD exists below which the performance of the perforated coalescer media is adversely impacted. For example, for fuel water separation the value of dD should be greater than $1.0 \times 10^5$ μm m$^{-2}$, particularly greater than $2.0 \times 10^5$ μm m$^{-2}$, and more particularly greater than $4.0 \times 10^5$ μm m$^{-2}$. For other fluid and flow conditions, different values of dD may be used.

Further, perforation diameter, Frazier permeability, filter media 106 thickness, and the density of the perforations 114 affect the rate of dispersed phase 110 drainage from the filter media 106. The perforation diameter should be great enough and the density of the perforations 114 should be large enough that excess dispersed phase 110 in and on the filter media 106 can drain, yet not so great as to cause unacceptable levels of emulsified dispersed phase 110 to pass through the perforations 114 rather than be captured. By treating the perforations 114 as capillaries penetrating the filter media 106, the minimum perforation diameter, Frazier permeability, filter media 106 thickness, and the density of the perforations 114 needed to ensure drainage can be modeled using the Hagen-Poiseuille law. The drainage rate of dispersed phase 110 through the perforations 114 is a function of the following properties of the filter media 106: perforation diameter (d; μm), Frazier permeability (F; feet/minute), perforation density (D; number of perforations 114 per square meter), and filter media 106 thickness (L; mm) These parameters can be used to define a parameter, P, as follows in Equation 3:

$$P = \frac{d^4 D}{FL} \quad (3)$$

The above-calculated parameter P has units of μm$^4$ min m$^{-2}$ ft$^{-1}$ mm$^{-1}$. For brevity purposes, the units are not discussed below. The performance of filter media is adversely affected when the value of P exceeds $3.0 \times 10^{12}$. Accordingly, the value of P should be less than $3.0 \times 10^{12}$. In some arrangements, the value of P should be less than or equal to $1.5 \times 10^{12}$. In other arrangements, the value of P should be less than or equal to $3.0 \times 10^{11}$. Alternatively, in MKS units for all parameters, the performance of the filter media is adversely affected when the value of P exceeds $6 \times 10^{-7}$ s. In some arrangements, the value of P should be less than or equal to $3 \times 10^{-7}$ s. In further arrangements, the value of P should be less than or equal to $6 \times 10^{-8}$. In such arrangements, the filter media 106 may have a perforation diameter greater than or equal to 200 μm (e.g., between two-hundred (200) and three-thousand (3,000) μm) and/or a perforation density greater than 625 m$^{-2}$ (e.g., between two-thousand five-hundred (2,500) and forty-thousand (40,000) m$^{-2}$). The density of the perforations 114 may also be represented as a number of occurrences (e.g., instances, etc.) of the perforations 114 per square meter.

It should be noted that the average linear distance between the perforations 114 may be used as a surrogate for the density of the perforations 114. This surrogate is useful for such embodiments where the perforations 114 are not distributed over the entire surface of the filter media 106, but rather over only a portion of the entire surface of the filter media 106, such as the embodiments shown in FIGS. 7B, 7C, and 7G. In various applications, it has been found that it is advantageous to configure the filter media 106 such that an average linear distance between the perforations is less than or equal to fifty (50) millimeters, less than or equal to twenty-five (25) millimeters, less than or equal to ten (10) millimeters, and less than or equal to five (5) millimeters.

Figure 4:
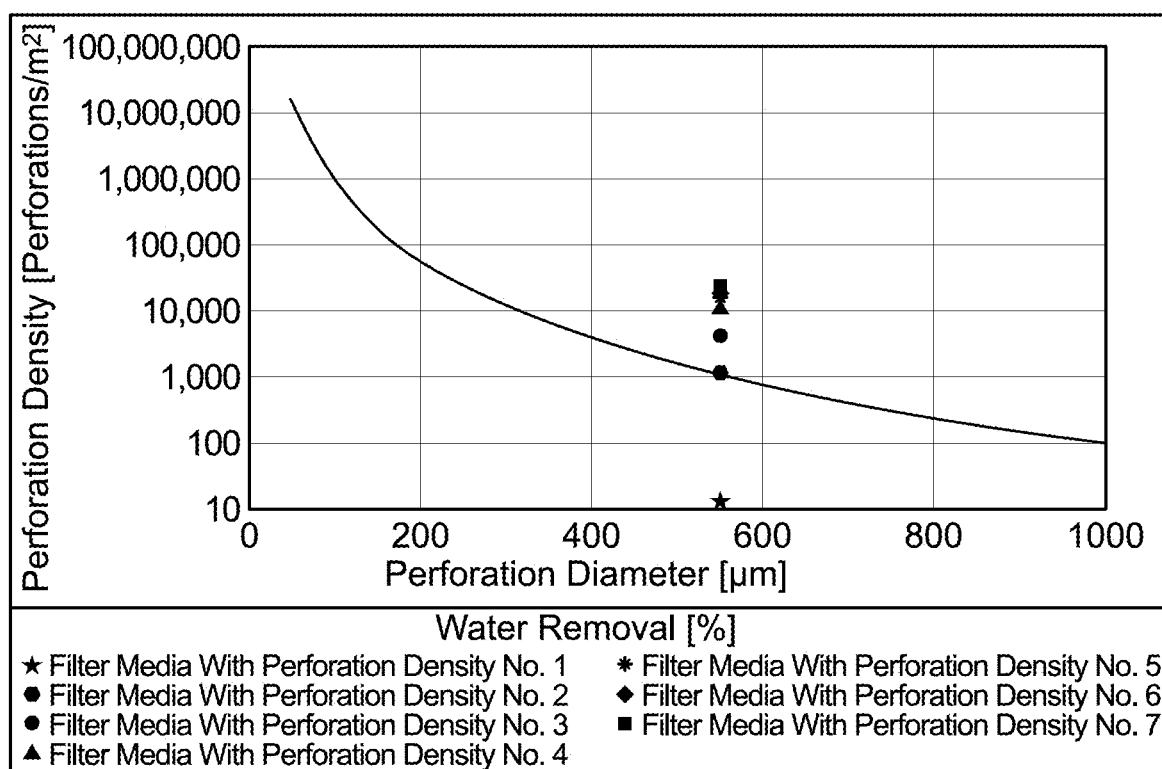
FIG. 4 shows a graph comparing the water removal efficiency of various filter media having different perforation densities and perforation diameters.

The relationship between perforation diameter ("d") and perforation density ("D") is shown as a curved line in FIG. 4 for a typical fuel-water separation application for illustrative purposes.

As shown in FIG. 4, a series of seven diamonds labeled with the associated observed dispersed phase 110 (in the case of FIG. 4, water) removal efficiency is also shown at a perforation diameter of five-hundred and fifty (550) μm. The dispersed phase 110 removal is increased as the density of the perforations 114 increases. To ensure drainage under defined conditions, the density of the perforations 114 and perforation diameter should be located above the line shown in FIG. 4. It has been found that dispersed phase 110 removal is enhanced when the value of P (e.g., as calculated via Equation 3) for the perforated filter media 106 is less than a value of $6 \times 10^{-7}$ s. As shown in FIG. 4, there is a point at which the perforation density becomes too great and/or perforation diameter too large to achieve the full benefit of the perforated filter media 106. The optimal range for perforation density and perforation diameter depends in part on the flow rate through the perforations 114 relative to the flow through unperforated portions of the filter media 106.

Figure 5:
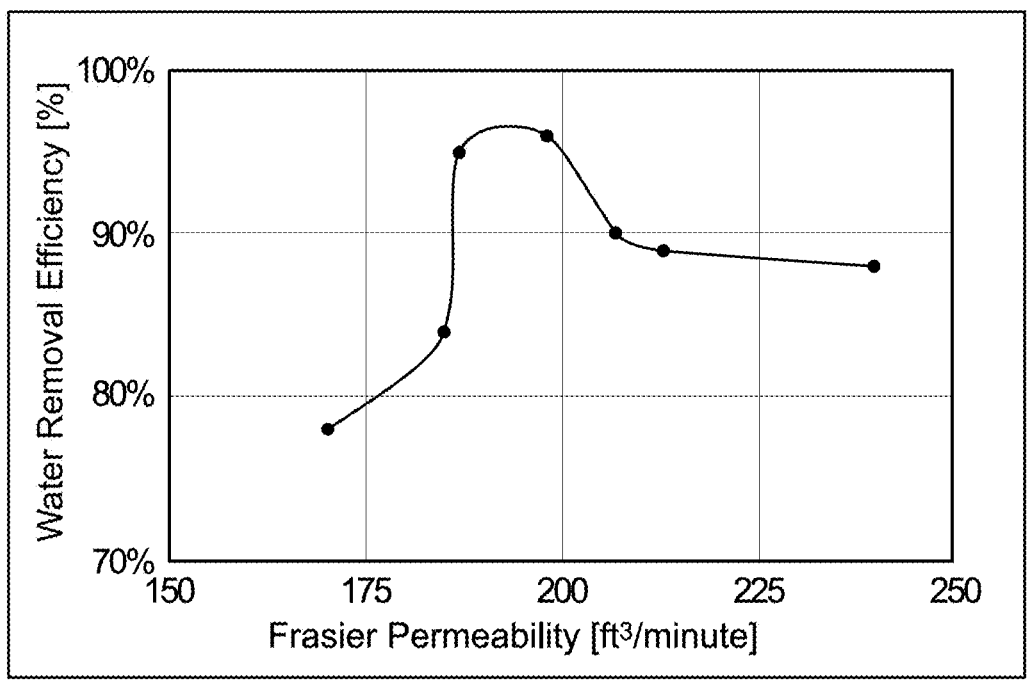
FIG. 5 shows a graph illustrating how water removal efficiency is influenced by Frazier Permeability for filter media in a fuel water mixture.

FIG. 5 shows a graph showing how water removal efficiency is influenced by Frazier Permeability for the filter media 106 in a fuel water mixture. Each data point in FIG. 5 was obtained using the same base filter media, but with differing perforation densities. By increasing the perforation density, Frazier Permeability was also increased. From FIG. 5, it can be seen that water removal efficiency increases rapidly with increasing Frazier Permeability (and increasing perforation density) before declining. The observed increase in water removal efficiency with increasing Frazier Permeability obtained by punching holes in the filter media is unexpected and contrary to established principles of filter design. At Frazier permeability values greater than about two-hundred (200) feet per minute, the benefit of the increased perforation density diminishes as water accumulation around individual perforations 114 is decreased and increasing amounts of emulsified water pass through the perforations 114 without being captured and coalesced. As previously noted, performance of the filter media is also a function of perforation diameter and filter media thickness, so two-hundred (200) feet per minute is regarded as a Frazier Permeability limit for the specific test conditions and under other conditions may be greater.

Figure 6:
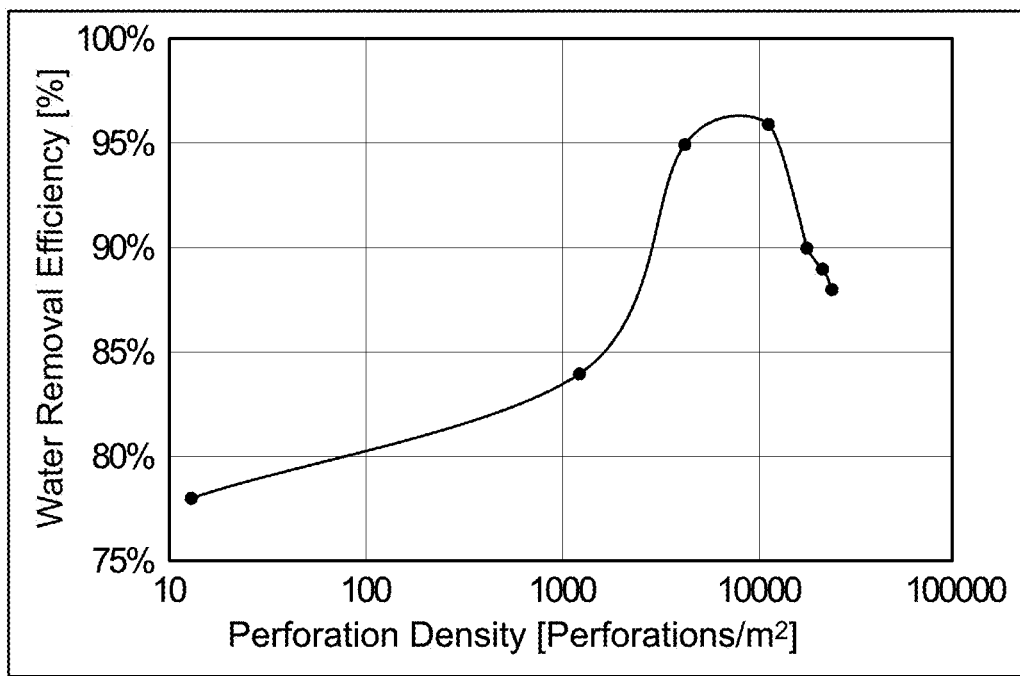
FIG. 6 shows a graph of the influence of perforation density on water removal efficiency.

The performance enhancement due to the perforated filter media 106 is greatest when less than ten percent of the total flow rate passes through the perforations 114, and more specifically between 0.5 percent and five percent. The results can also be expressed in terms of the perforation density as shown in FIG. 6. The results show that for the test conditions described above with respect to FIG. 5, the performance enhancement due to the perforated filter media 106 layer is greatest when the perforation density is greater than six-hundred twenty-five (625) perforations $m^{-2}$, and specifically between two-thousand five-hundred (2,500) and forty-thousand (40,000) perforations $m^{-2}$. In these tests, the perforations 114 were located near the bottom on the filter element 100 with respect to gravity 112 (e.g., as described with respect to FIG. 7B below).

Figure 7D:
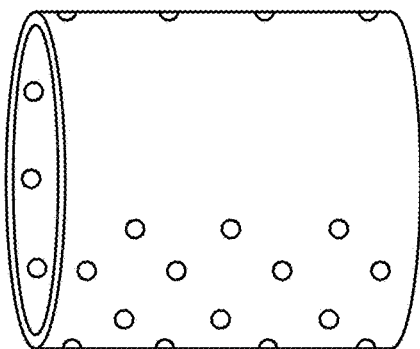
FIGS. 7A, 7B, 7C, 7D, 7E, 7F, 7G, and 7H each show a different example cylindrical filter element having perforations.
Figure 7H:
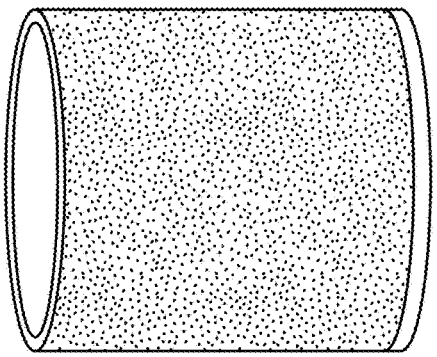
Figure 7C:
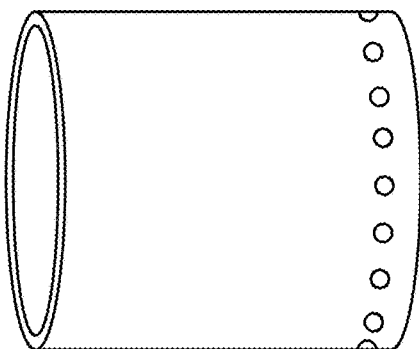
Figure 7G:
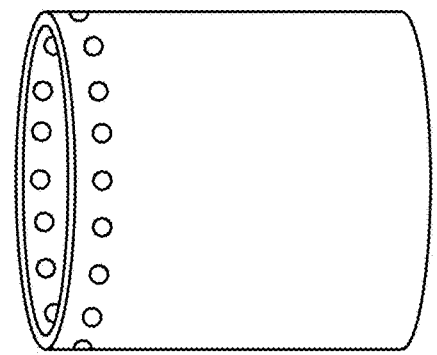
Figure 7B:
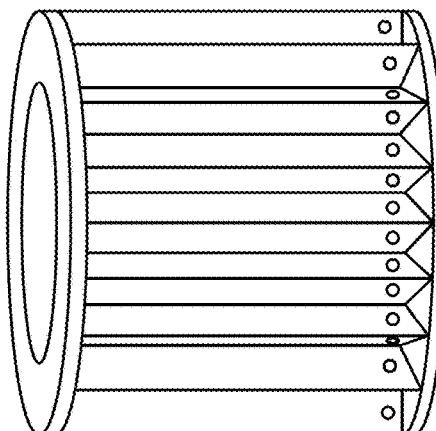
Figure 7F:
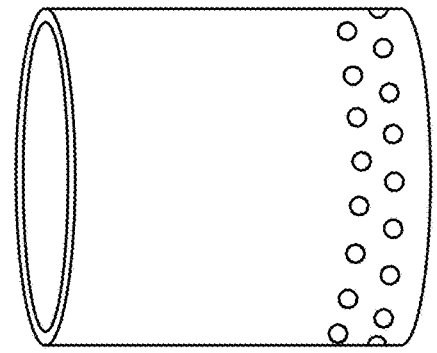
Figure 7A:
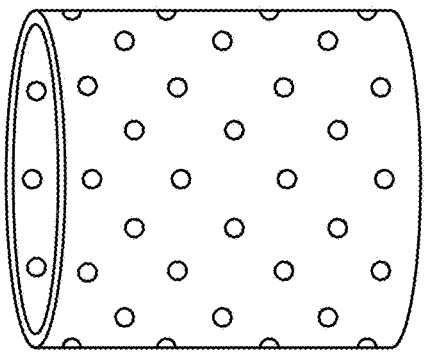

Referring to FIGS. 7A through 7H, example spatial arrangements of the perforated filter media 106 of the filter element 100 are shown. The spatial location of the perforations 114 along the filter media 106 may be used to optimize filter element 100 performance. FIG. 7A shows the filter media 106 having the perforations 114 uniformly distributed across the filter media. In the arrangement of FIG. 7A, the perforations 114 are evenly spread over the surface of the filter media 106. As such, no matter where the dispersed phase 110 is first captured, the captured dispersed phase 110 has a relatively short distance to drain to the nearest perforation 114.

FIG. 7B shows the filter media 106 being pleated and having a single circumferential row of perforations 114 near the bottom of the filter media 106 (with respect to the direction of gravity). FIG. 7C shows the filter media 106 as an unpleated filter media pack having a single circumferential row of perforations 114 near the bottom of the filter media 106 (with respect to the direction of gravity).

In both the arrangement of FIGS. 7B and 7C, the perforations 114 are optimized for applications where the dispersed phase 110 readily drains towards the bottom of the filter element. The positioning of the perforations 114 with respect to pleat tips (of FIG. 7B), particularly on the pleat faces as opposed to the pleat tips or pleat valleys, may be used to further optimize performance. In an alternative arrangement of FIG. 7B or 7C, the perforations 114 are replaced with at least one layer of filter media positioned such that there is a small gap between the ends of the filter media 106 and filter endplate (e.g., the second endplate 104). For example, if the layer of filter media 106 is allowed to just "touch" the endplate but not be bonded (e.g., glued) to it, or if a small gap (e.g., less than one millimeter) is present, the same effect can be observed as with the perforations 114. As another alternative, cutting small slots in the filter media 106 edge, or creating a zig-zag cut in the end of the filter media 106, such that some bypass (flow through) points remain after adhering the media to the endplate, will also work as the perforations 114 described herein.

Figure 7E:
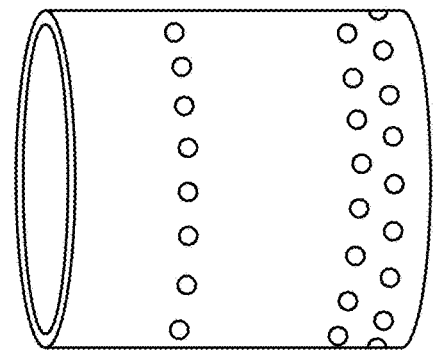

FIG. 7E shows the filter media 106 having three circumferential rows of perforations 114: two near the bottom of the filter media 106 (with respect to the direction of gravity) and one centrally located between the top and the bottom. Similarly, FIG. 7F shows the filter media 106 having a two circumferential rows of perforations 114 near the bottom of the filter media 106 (with respect to the direction of gravity). The arrangement of FIG. 7E may be advantageous compared to the arrangement of FIG. 7F in applications where providing an intermediate dispersed phase 110 collection and drainage point is beneficial (e.g., in FWS applications where the fuel has a high water concentration).

FIG. 7G shows the filter media 106 having perforations 114 near the top of the filter media 106 (with respect to the direction of gravity). The arrangement of FIG. 7G would be beneficial in applications, such as oil water separation, where the dispersed phase 110, oil, is less dense than the continuous phase 108, water.

For a particular coalescer element or media pack, it is not necessary that the entire surface of the perforated layer be covered by the perforation pattern nor by the same perforation pattern. For example, FIG. 7D shows the filter media 106 arranged in a similar manner to that of FIG. 7A, except that the perforations 114 do not completely encircle the filter media 106 pleat pack. The arrangement of FIG. 7D may be advantageous to focus dispersed phase 110 collection in a certain portion of the filter element 100 or to alternatively to direct dispersed phase 110 water away from a certain portion of the filtration system. For example, if a filtration system is arranged in a manner that dispersed phase collects on a particular area or side of the filter media, the perforations 114 can be arranged to be in that area or side, and not on (or lower frequency) the other areas or sides.

In some applications, it may be beneficial to have perforations 114 of at least two different sizes on a first layer of the filter media 106. For example, the first layer of the filter media 106 may be configured such that perforations 114 having a first diameter (or other opening size) (e.g., ten (10) millimeters, etc.) are positioned proximate to a first end of the filter media 106 and such that perforations 114 having a second diameter (or other opening size) (e.g., 1.5 millimeters, etc.) are positioned proximate to a second end of the filter media 106 opposite the first end. In one example embodiment, the first end of the filter media 106 is located near the top of the filter element 100 and the perforations 114 located along the first end of the filter media 106 have a diameter that is larger than the perforations 114 located along the second end of the filter media 106. In this embodiment, an increased portion of the continuous phase 108 is at the top of the filter element 100. The filter media 106 also includes a second layer of the filter media 106, downstream of the first layer of the filter media 106. The second layer of the filter media 106 includes the perforations 114 located along a bottom end of the second layer of the filter media 106, proximate to the second end of the first layer of the filter media 106. The coalesced dispersed phase 110 may then be drained through the perforations 114 in the second layer of the filter media 106. In this way, the perforations 114 located along the second end of the second layer of the filter media 106 function as small drain holes. Rather than the second layer of the filter media 106, the filter element 100 may instead implement a non-perforated hydrophobic layer to perform final removal of the coalesced dispersed phase.

In some arrangements, it is not necessary that there be more than one perforation 114 nor that the perforations 114 be round. For example, FIG. 7H shows the filter media 106 in stippled shading surrounding a conventional unperforated filter media in white for a conventional cylindrical coalescer element. The height of filter media 106 is less than that of the conventional filter media (e.g., the height of the filter media 106 as shown in FIGS. 7A through 7G), which results in a single "perforation" or gap at the bottom of the filter element where the filter media may be slightly lifted from an endplate of the filter element. This single perforation or gap functions in the same manner as described above with the perforations 114 and meets all requirements previously described for this invention and may be advantageous for certain applications.

The presence of perforations 114 in a particular pattern is relatively easy to detect. For example, an ordered array or pattern may be discerned visually as a pattern of bubble rising from a filter or filter media while gradually increasing the pressure during a bubble point test as per SAE ARP901 "Bubble-Point Test Method" (2001), ASTM F316-03 "Standard Test Methods for Pore Size Characteristics of Membrane Filters by Bubble Point and Mean Flow Pore Test" (2011), or ISO 2942. A more random appearance would be observed from filters or filter media that have large pores or perforations 114, as opposed to a pattern of perforations 114. Alternatively, during a fuel water separation test, e.g., SAE J1488, a distinctive pattern of drops emerging from the filter element may be observed. Microscopy or other methods of identifying a pattern may also be used. As discussed above, improved dispersed phase 110 removal is obtained when the perforations 114 are located near the bottom of the filter element (e.g., as shown in FIGS. 7B, 7C and 7F), where the dispersed phase 110 tends to accumulate (e.g., as in a conventional FWS). In some arrangements of a FWS, the best water removal efficiency was obtained when the majority of the perforations 114 are located in the lower half (with respect to height) of the filter element or coalescer filter media pack. In some arrangements, the perforations 114 are located in the bottom third of the filter element 100. In further arrangements, the perforations 114 should be located in the bottom quarter of the filter element 100 (e.g., as illustrated in FIGS. 7B, 7C, and 7F).

Although FIGS. 7A through 7H show cylindrical filter media 106, the filter media 106 may be arranged in other geometric arrangements found in conventional filter elements. Further, although each of FIGS. 7A through 7G shows a single layer of filter media 106 with perforations 114, additional layers of filter media (e.g., as shown in FIG. 7H), upstream or downstream of the perforated filter media 106—with or without perforations 114—may also be present. Due to the effect of gravity and the previously described texturing of the media that may help create a gap between successive layers of filter media, coalesced dispersed phase 110 tends to accumulate in different places during use. For example, in traditional FWS or crankcase ventilation coalescers with vertical orientation, the dispersed phase 110 tends to accumulate at the bottom of the filter element. If the element is pleated (e.g., as shown in FIG. 7B), the dispersed phase 110 may also collect in the valleys of pleats. As a result, these areas contribute excessively to the restriction across the FWS filter element and exhibit diminished droplet removal. As a result, the positioning of perforations 114 can influence the performance of the filter media 106.

Another consideration regarding perforation location is the downstream flow profile of continuous phase 108 (e.g., fuel in a FWS application). Depending on filter design, every filter element has its own flow profile downstream of the filter media. In order to maximize the size of released drops of dispersed phase 110 and their removal by settling, perforations 114 may be located in more quiescent or lower velocity regions where released drops are exposed to less shear and drag. For example, referring to FIGS. 7B and 7C, if the continuous phase 110 flows from outside to inside of the filter element and fuel leaves the element from the top, the downstream velocity near the top of the filter element will be greater than at the opposite end. In such an arrangement, the perforations 114 may be located closer to the bottom of the filter element than the top of the filter element.

The perforated filter media 106 layer described above can be used in combination with other layers of filter media to further enhance performance (e.g., liquid-liquid performance, gas-liquid performance). The inclusion of a perforated layer of filter media 106 in any coalescer, composite media, or multistage filter may be used to enhance the performance (e.g., liquid-liquid performance, gas-liquid performance). Typically, providing perforations 114 in a layer of filter media as described (transforming it into a perforated layer) is most beneficial when, in their absence, dispersed phase 110 (e.g., water) accumulation at or in that layer of the multi-layer filter contributes significantly to the pressure drop, when the perforations 114 are used to direct the flow of captured dispersed phase 110 in a manner that increases coalescence, or when the perforated layer directly impacts the size of released drops of dispersed phase 110.

Figure 8D:
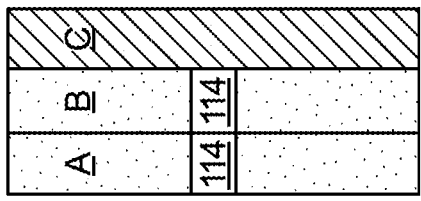
FIGS. 8A, 8B, 8C, 8D, 8E, 8F, 8G, and 8H each show a different example filter media arrangement having at least one layer of perforated filter media.
Figure 8C:
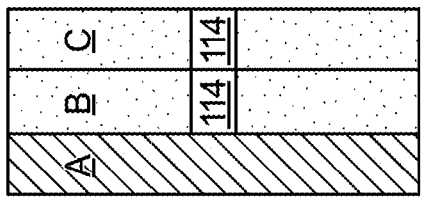
Figure 8B:
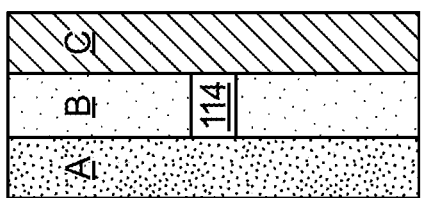
Figure 8A:
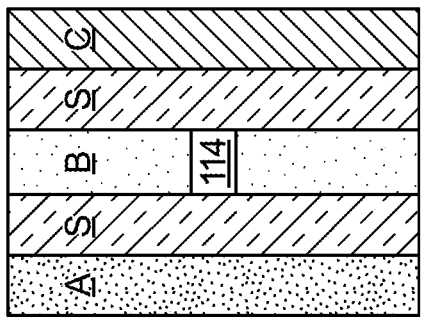
Figure 8H:
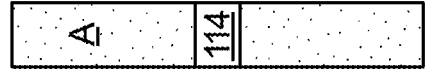

FIGS. 8A through 8H show example filter media arrangements having at least one layer of perforated filter media having perforations 114. In the arrangements of FIGS. 8A through 8G, further performance enhancements may be obtained when perforated layer(s) (e.g., as previously described above with respect to the perforated filter media 106) are used in combination with other layers of filter media or independent filter media (e.g., in series filtration with multiple stages of filtration). In the arrangement of FIG. 8H, a single layer of perforated media is shown. In each of the arrangements of FIGS. 8A through 8H, layers (A, B and C) refer to different layers of filter media; (S) indicates a space or gap between layers of filter media; and perforations 114 are indicated.

Any layer (i.e., A, B, or C) that has a perforation 114 is referred to as a perforated layer. It should be understood that layers (A, B, or C) do not define or limit the properties of the layer of filter media (e.g., the layer (A) in FIG. 8A may be a different filter media or the same filter media as the layer (A) in FIG. 8B), but are just to provide context of the layers of filter media in the flow direction. The flow direction is from left to right as drawn (i.e., layer (A) being the most upstream layer, layer (B) being downstream of layer (A) and upstream of layer (C), layer (C) being downstream of both layers (A and B), etc.).

Figure 8G:
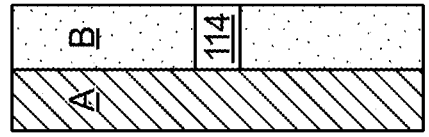
Figure 8F:
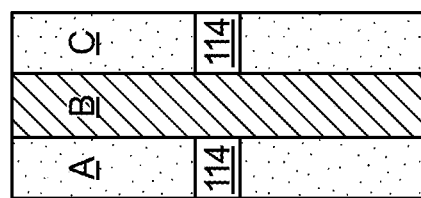
Figure 8E:
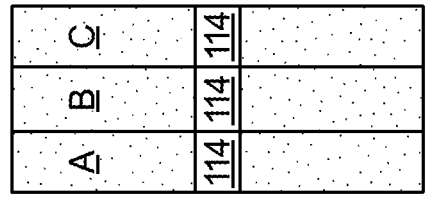

FIG. 8A shows a three filter media layers or stage configuration with each layer separated by space or gap labeled as (S), with middle layer (B) serving as the perforated layer. FIG. 8B is similar to FIG. 8A, except that there is no space or gap between filter media layers. FIG. 8C is similar to FIG. 8A, except that layers (B and C) are both perforated layers. In a variation of this embodiment, one of the layers (B and C) does not include the perforations 114 and the other of the layers (B and C) does include the perforations 114. FIG. 8D is similar to FIG. 8C, except that layers (A and B) are perforated layers, but not layer (C). In a variation of this embodiment, one of the layers (A and B) does not include the perforations 114 and the other of the layers (A and B) does include the perforations 114. FIG. 8E is similar to FIGS. 8B, 8C, and 8D, except that all three layers are perforated layers. In a variation of this embodiment, at least one of the layers (A, B, and C) does not include the perforations 114 and the others of the layers (A, B, and C) do include the perforations 114. FIG. 8F is similar to FIG. 8E, except that layer (B) is not a perforated layer. In a variation of this embodiment, one of the layers (A and C) does not include the perforations 114 and the other of the layers (A and C) does include the perforations 114. FIG. 8G is a two layer configuration in which layer (B) is a perforated layer. FIG. 8H is a one layer configuration in the filter media layer is a perforated layer.

It should be understood that FIGS. 8A through 8H are illustrative and not indicative of all potential filter media layer combinations; other combinations of layers and perforations 114 are contemplated. For example, in some arrangements, a region of filter media can consist of one layer or multiple layers of media having two different polymeric media laminated to each other. Applying this concept to the arrangement of FIG. 8G, layer (A) may be comprised of multiple layers of filter media laminated to each other, and layer (B) may comprise a single layer of media with perforations 114.

In each of FIGS. 8A through 8H, the perforated layer(s) may be used in combination with other layers. In some arrangements, layers adjacent to a perforated layer are not tightly mated, attached, or bonded together, as previously discussed. This relative association between layers adjacent to a perforated layer creates a small space or gap and allows water to flow relatively unhindered parallel to the media layer surface towards the perforations 114. The relative association between layers increases the path length and residence time of the drops of dispersed phase 110 in the media, as the droplets zig-zag through the media, thus providing greater opportunity for droplets to coalesce.

As used with respect to FIGS. 8A through 8G, the terms "space" or "gap" refers to a physical separation between adjacent filter media layers, or a portion of adjacent filter media layers, but does not imply any particular minimum or maximum separation, nor does it imply the complete separation between the layers. For example, in FIG. 8A, if layer (B) is crinkled or corrugated and layer (A) lies on top of and physically touching layer (B), there will be spaces between the two layers in the valleys of the corrugations or crinkles. Accordingly, in FIG. 8A, layer (A) may act as a prefilter or preseparator while layer (B) (with perforations 114) would facilitate drainage and release of enlarged drops readily separated by layer (C). Further, the texturing (i.e., the positioning, configuration, and number of the perforations 114) may be varied for any of the layers (A, B, C) shown in FIGS. 8A through 8G.

The arrangement of FIG. 8B would behave similarly, although the absence of a space upstream of (B) may hinder drainage somewhat while the absence of space downstream of (B) means that released drop size would largely be controlled by layer (C). The arrangement of FIG. 8C is structured to behave like the arrangement of FIG. 8B, except that layer (C) provides support for layer (B) while layer (C)'s perforations 114 would yield larger released drops of coalesced dispersed phase 110 than the arrangement of FIG. 8B. The arrangement of FIG. 8D includes perforations 114 in layers (A and B), which provides enhanced drainage and accumulation of dispersed phase 110 at the perforations 114, as well as structural support from layer (C), but released drop size would ultimately be controlled by layer (C).

The arrangement of FIG. 8E includes three layers with each layer possessing perforations 114. This arrangement provides enhanced drainage of all layers and released drop size regulated by the perforations 114 of layer (C), but may have increased risk of uncoalesced dispersed phase 110 passing through the perforations 114 rather than being separated by the media. The arrangement of FIG. 8F has the advantage of enhanced drainage for layers (A and C), as well as dispersed phase 110 accumulation at the perforations 114 in these layers and the perforations 114 in layer (C) controlling released drop size, while layer (B) eliminates bypass of dispersed phase 110 through the media. The arrangement of FIG. 8G utilizes the perforations 114 in layer (B) to improve drainage and enhance the size of released drops.

In the arrangements of FIGS. 8A through 8G, arrangements in which more than one layer possess perforations 114 are illustrated as if the perforations 114 are aligned. However, this is done for illustrative purposes only, as particular arrangements do not require the perforations 114 to be aligned within the layers, nor does it require that the layers possess the same diameter for all of the perforations 114 or the same density of the perforations 114. In fact, benefits may be obtained by intentionally misaligning the perforations 114. For example, in the arrangement of FIG. 8C, the perforations 114 in layers (B and C) may be located axially or circumferentially out of alignment to ensure that all of the fluid must pass through at least some filter media (as opposed to bypassing the media through the perforations 114) or to increase drainage time and allow greater time for coalescence to occur.

In such multilayer arrangements of FIGS. 8A through 8F, separation of the dispersed phase 110 from the continuous phase 108 is further enhanced when there is a separation (e.g., a space or gap) between the perforated filter media layer and any adjacent layer of filter media upstream of the perforated layer (in the flow direction). An example of this technique is illustrated in FIG. 8A, where gaps (S1 and S2) exist between the layers of the filter media. In multilayered or composite filter media, individual layers of filter media may be bound or attached to one another by a variety of techniques (e.g., through the use of adhesives, thermal or ultrasonic bonding, chemical bonding, needle punching, etc.).

To facilitate ease of handling and production, the surfaces of the individual layers in composite filter media may be bound and fixed, so as not to move relative to one another at their interface. In some arrangements, upstream layers are not fixed relative to the perforated layer such that there be a gap or space (e.g., as in FIG. 8A with gap S1) between the two through which captured and coalesced dispersed phase 110 may flow to the perforations 114 in the perforated layer. Practically, the gap may be created in any of a number of ways, including any combination of: (1) not bonding the perforated layer to its adjacent upstream layer, (2) ultrasonically bonding the perforated layer to its adjacent upstream layer (and any other layers) with bond points separated far enough apart to enable relative movement between the layers and leave a small gap between the layers, (3) texturing the surface of either the perforated layer or its adjacent upstream layer, such as by introducing surface crinkles, creases, furrows, wrinkles or similar features, to create localized gaps between the layers, (4) pleating or corrugating the perforated layer or its adjacent upstream layer, (5) bonding only on the top and bottom edges of the non-pleated cylinder to hold the layers together during assembly, and to pot or embed these bond points in the endplates during filter element assembly, or (6) use a small number of point bonds or vertical bonding strips to hold the layers together during assembly.

Some of the above-listed techniques, notably corrugations, pleats, surface roughness, and texturing, yield a secondary benefit by directing the dispersed phase 110 towards the perforations 114, where the coalesced dispersed phase 110 accumulates, coalesces further, and drains, freeing up areas without the perforations 114 to separate the smaller droplets without accumulating excess dispersed phase 110. For example, when filter media possesses vertically aligned pleats or corrugations with perforations 114, the pleat valleys may be blinded off by compression of the filter media, so it may be desirable to locate the perforations 114 on the pleat faces in such specific cases.

It is noteworthy that the gap between layers need not cover the entire upstream face of the perforated layer. In some arrangements, the gap between the layers covers at least 20% of the face area of the perforated filter media. The thickness of the gap may be small. Performance improvement may be achieved if the perforated layer and its adjacent upstream layer are in direct contact, but their surfaces not fixed relative to one another, such that some movement relative to one another is possible. Further performance improvement may be achieved with wrinkled perforated layers where the maximum separation between layers forming a gap is greater than zero μm. In some arrangements, the maximum separation between layers forming the gap is greater than one μm. In further arrangements, the maximum separation between the layers forming the gap is greater than one-hundred (100) μm. In some arrangements, the gap varies between zero and one-thousand (1,000) μm. In other arrangements, the gap varies between one and one-hundred (100) μm. In other arrangements, the maximum separation between the two layers is less than five-thousand (5,000) μm. In still further arrangements, the maximum separation between the two layers is less than three-thousand (3,000) μm. In yet further arrangements, the maximum separation between the two layers is less than one-thousand (1,000) μm. The use of small gaps (e.g., gaps of less than one-thousand (1,000) μm) is contrary to established coalescer design practices, in which gaps of greater than one millimeter between the so-called coalescer and separator layer are taught in order to ensure adequate space for coalesced water drops to settle. In contrast, the described filter media arrangements use small gaps to direct the flow of coalesced dispersed phase towards perforations 114 where they accumulate, further grow in size, and are released.

In any of the above-described or below-described multilayer media arrangements, the perforated layer of media may be co-pleated with a non-perforated media to secure the perforated layer of media to the non-perforated media. The co-pleated media may then be attached to filter cartridge endplates in a standard manner. In such arrangements, the perforated layer media has high permeability, intended to capture the coalesced dispersed phase droplets and drain the coalesced dispersed phase droplets through perforations 114 in the perforated filter media. The perforations 114 may be positioned anywhere along the face or pleat tips of the media (e.g., as described above with respect to FIGS. 7A through 7H), preferably with at least one perforation 114 per pleat face. The non-perforated media in the co-pleated media serves as particle removal filter and initial coalescer.

Such co-pleated media provides certain benefits, including improved manufacturability. The co-pleated media results in greater media area for the perforated layer than an unpleated cylinder, which results in a lower face velocity and thereby improving removal and coalescing performance. The perforated layer of the co-pleated filter media may be placed upstream of the center tube, and is integrated into the pleat pack such that it does not require a separate tube, which provides for a simple filter element assembly process.

In addition to perforation diameter, perforation density, Frazier permeability, and filter media thickness, the introduction of multilayer filter elements, and a gap upstream of the perforated layer, the location or positioning of the perforations 114 in the perforated layer also affects removal of the dispersed phase. Ideally, the perforations 114 should be arranged in linear rows (i.e., about the circumference of a cylindrical filter element), in an ordered array, or in another geometrical pattern with perforations 114 approximately equidistant from one another. However, it should be understood that non-uniform spacing of the perforations 114 (e.g., a random pattern of perforations 114) also assists in draining coalesced dispersed phase from the filter media.

Figure 9A:
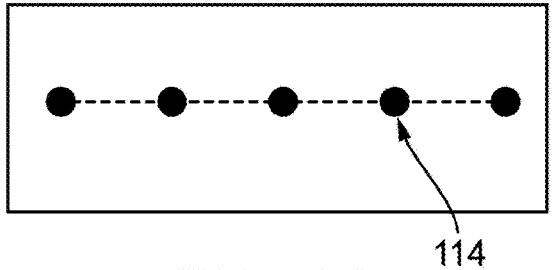
FIGS. 9A, 9B, 9C, 9D, and 9E each show a different example perforation pattern for perforated filter media.
Figure 9B:
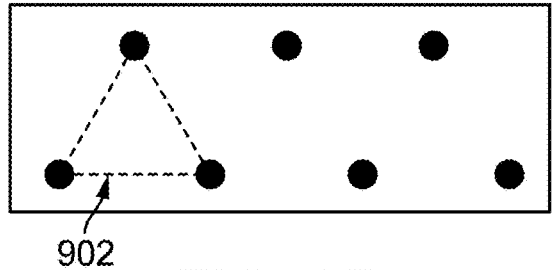
Figure 9C:
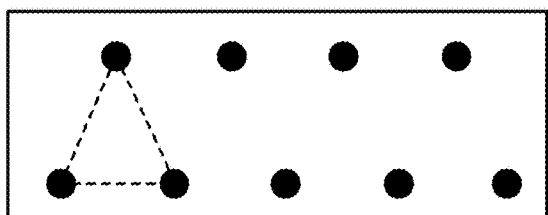
Figure 9D:
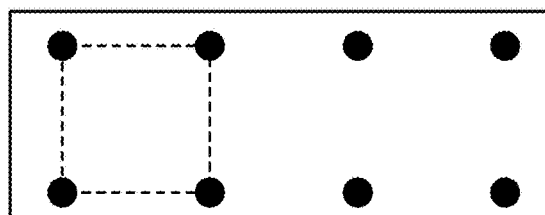
Figure 9E:
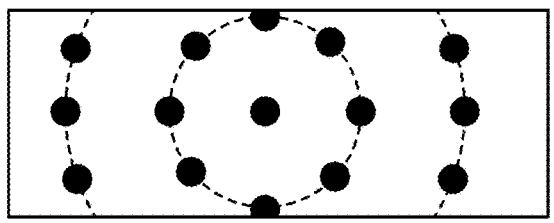

FIGS. 9A through 9E show example perforations patterns for the perforated layer of filter media 106. In each of FIGS. 9A through 9E, the perforations 114 are shown as black circles. Dashed lines (identified by 902) are used to illustrate the corresponding "base unit" used to create the pattern. The base unit is created across an area of the filter media 106 to create a perforation pattern (e.g., as shown in FIGS. 7A through 7G). FIG. 9A shows the simplest pattern and uses a line or row of perforations 114 as the base unit. FIG. 9B uses an equilateral triangle as the base unit to create the ordered array or pattern and may be a preferred pattern for certain applications. FIG. 9C uses a base unit of an isosceles triangle. FIG. 9D uses a square base unit, but other quadrilateral base units may also be used. FIG. 9E uses concentric circles as the base unit. Other patterns or combinations of base units (e.g., equilateral triangles and squares, circles and lines, etc.) may also be used.

Figure 10:
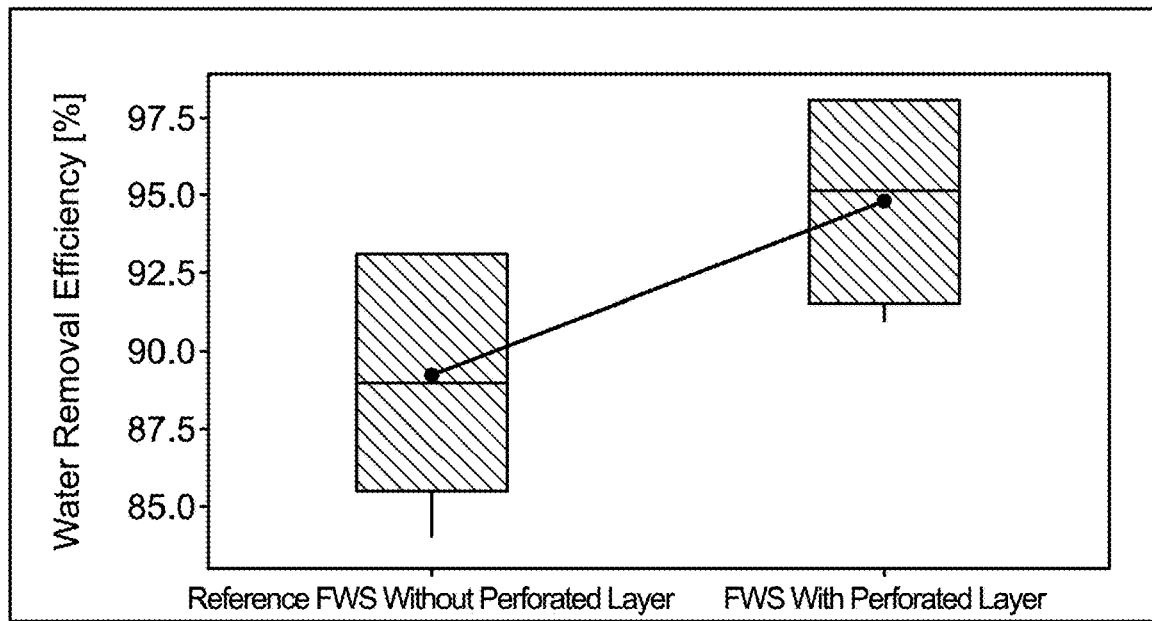
FIG. 10 shows a graph showing the improvement in water removal efficiency by a coalescer in a FWS possessing a perforated layer compared to a FWS without a perforated layer.

Referring to FIG. 10, a graph showing the improvement in water removal efficiency by a coalescer in a FWS possessing a perforated layer (e.g., a layer having the filter media 106) is shown. FIG. 10 compares the water removal efficiency for two coalescer elements tested under identical conditions. The coalescer elements were identical, except that one possessed two perforated layers, "FWS With Perforated Layer," while the other was the reference FWS, "Reference FWS Without Perforated Layer," which used the same media without the additional perforated layers (e.g., the type described in U.S. Pat. No. 8,678,202, contents of which are herein incorporated by reference in the entirety and for all purposes). Both types of FWS have identical non-pleated outer cylinders of polymeric nonwoven filter media, except that the FWS with perforated layer has two downstream-most layers which are perforated layers. These layers possessed perforations 114 that are approximately five-hundred fifty (550) μm in diameter arranged in a zig-zag pattern as shown in FIG. 7F. In the tested arrangement, the two rows of perforations 114 are about three millimeters apart. As shown, there is a six percent (6%) improvement in water removal efficiency when the element possesses perforated layers.

FIGS. 11 through 15 each describe specific arrangements of FWS coalescer elements utilizing the above-described perforated filter media. FWS coalescer elements separate water from a fuel water mixture as descried in U.S. Pat. Nos. 8,678,202, 8,590,712, and 8,517,185, the contents of which are herein incorporated by reference in their entireties and for all purposes. However, it should be understood that the contemplated perforated filter media layer of the present disclosure can be used with other types of coalescers, FWS, and FWS systems.

Figure 11:
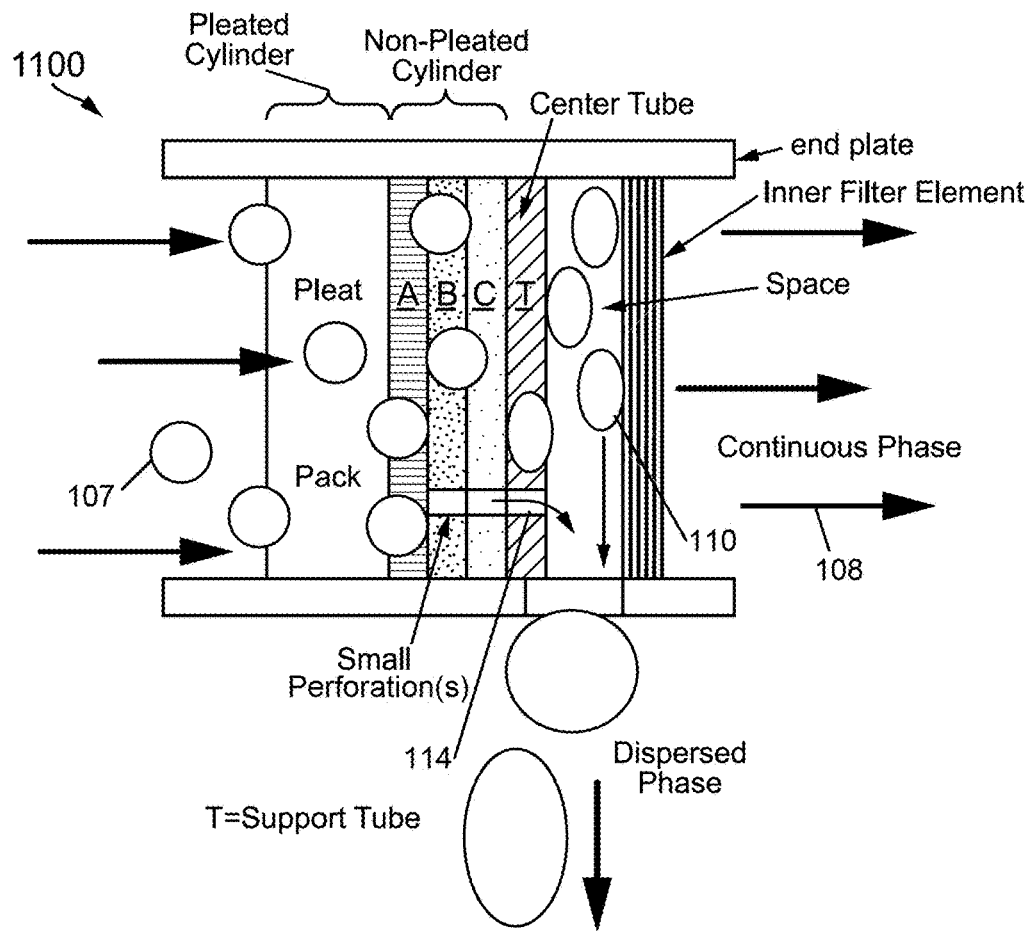
FIGS. 11 and 12 each show a cross-sectional view of a coalescer element for a FWS system is shown according to an example embodiment.

Referring to FIG. 11, a cross-sectional view of a coalescer element 1100 for a FWS system is shown according to an example embodiment. The coalescer element 1100 is a multi-layer coalescer element that includes layered filter media arranged in a cylindrical manner between two endplates. The coalescer element 1100 filters a fuel water mixture to remove water (the dispersed phase) from fuel (the continuous phase). The coalescer element 1100 is part of the FWS system, and provides the cleaned fuel to a component (e.g., an injector of an internal combustion engine, a fuel pump of an internal combustion engine, etc.). The coalescer element 1100 is configured to facilitate outside-in flow.

The coalescer element 1100 includes an inner pleated cylinder (labeled as a "Pleat Pack" in FIG. 11) comprised of pleated filter media and three additional filter media layers (A, B, and C). Two of the layers (B and C) include perforations 114 (labeled as "Small Perforation(s)" in FIG. 11). In FIG. 11, the flow of the fluid through the coalescer element 1100 goes from left to right, passing first through the pleated filter media and then through the three media layers (A, B, C) of a non-pleated cylinder where droplets of the dispersed phase (water) coalesce and drain before being released through the perforations 114 in the perforated layers (B and C). The flow then passes through the center tube (T), which provides structural support for the coalescer element 1100 against, for example, forces created by pressure changes and gradients, into a space (labeled as a "Space" in FIG. 11) between the perforated layers and an inner filter element (labeled as an "Inner Filter Element" in FIG. 11). In the space, the enlarged drops settle out while the fuel (continuous phase) continues through the inner filter element to the component. The center tube (T) includes the perforations 114 and is not a solid tube. The improved performance of the arrangement of FIG. 11 is detailed above in FIG. 10.

In an example arrangement, the coalescer element 1100 is configured to facilitate outside-in flow where the pleated filter media is positioned around a periphery of the coalescer element 1100 and the inner filter element is positioned around an inner periphery of the coalescer element 1100. The first layer (A) may be relatively stiff so as to form a tube shape when bonded to the perforated layers (B and C). Depending on the application, the inner-most perforated layer (C) may have a permeability of greater than one-hundred (100) cubic feet per minute, greater than two hundred cubic feet per minute, or greater than three-hundred (300) cubic feet per minute. To achieve a permeability of greater than three-hundred (300) cubic feet per minute, the inner-most perforated layer (C) could be constructed from, for example, mono-filament woven screen (e.g., using polyester fibers, using nylon fibers, etc.). While in FIG. 11 the coalescer element 1100 is illustrated as including three layers (A, B, C), it is understood that any number of layers may be similarly implemented in the coalescer element 1100. For example, the coalescer element 1100 may include four layers. Regardless of the number of layers incorporated in the coalescer element 1100, according to various embodiments it is advantageous for the coalescer element 1100 to be configured such that the most downstream layer (e.g., the third layer (C), etc.) include the perforations 114.

With the arrangement of FIG. 11, the performance improvements continue over the life of the coalescer element 1100 and are not temporary. Additionally, the coalescer element 1100, with the arrangement of FIG. 11, may exhibit approximately eighty percent water removal efficiency for relatively high surfactancy fuels (e.g., biodiesel, etc.) compared to conventional filters which may have a water removal efficiency of approximately sixty-seven percent. Further, using the same high surfactancy fuels, the coalescer element 1100 is capable of providing a face velocity (e.g., a velocity of fuel provided from the inner filter element, etc.) that is four times a face velocity of fuel provided by conventional filters.

In some arrangements, the perforations 114 are located near the bottom end of the coalescer element 1100 with respect to gravity and a short distance (e.g., six millimeters, etc.) above the bottom endplate. In such arrangements, the clean continuous phase outlet of a corresponding filtration system is located at the top end of the filter media with respect to gravity, and away from the perforations 114 to maintain a low velocity region near the perforations 114, thereby preventing breakup of the coalesced dispersed phase. The location of the perforations 114 near the bottom end of the coalescer element 1100 may facilitate transmission of the dispersed phase (water) through the perforations 114 due to buoyancy forces.

In some arrangements, the perforations 114 are located near the top end of the coalescer element 1100 with respect to gravity and a short distance below the top endplate. In such arrangements, the clean continuous phase outlet of a corresponding filtration system is located at the bottom end of the filter media with respect to gravity, and away from the perforations 114 to maintain a low velocity region near the perforations 114, thereby preventing breakup of the coalesced dispersed phase.

In arrangements where the clean continuous phase outlet must be placed in the vicinity of the perforations 114, the filtration system can include a standpipe that extends above the height of the perforations 114 such that coalesced dispersed phase does not reenter the separated continuous phase at the outlet. As such, the perforations 114 are located at a point where water draining from the perforated layer accumulates in a low fluid velocity region on the downstream side of the coalescer element to minimize the breakup and re-entrainment of released water drops back into the fuel. The non-pleated tube may consist of a single perforated layer, two perforated layers preceded by a non-perforated layer (e.g., as shown in FIG. 11), or other combination of filter media layers bonded together or simply laid on top of one another. For fuel with low interfacial tension, coalesced drop size is decreased, and it is especially desirable in such instances to locate the perforations 114 so as to minimize drag forces that would otherwise entrain the drops in opposition to gravitational settling. In some arrangements, the center tube (T) may be upstream of the layers (A, B, C,). In other arrangements, one of the layers (B and C) does not include the perforations 114 and the other of the layers (B and C) does include the perforations 114.

Figure 12:
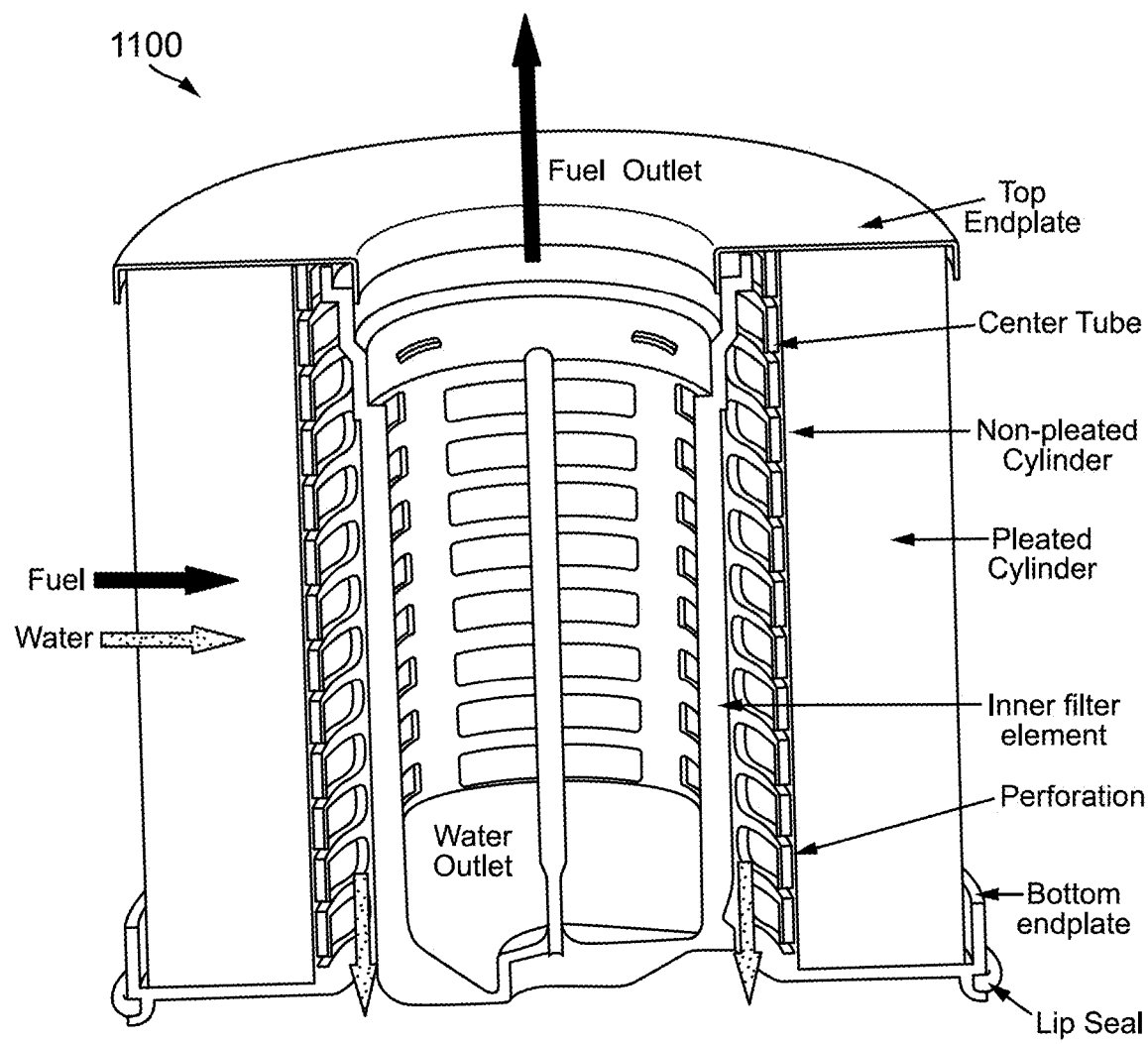

FIG. 12 shows another cross-sectional view of the coalescer element 1100. As shown in FIG. 12, the top endplate (labeled as a "Top Endplate" in FIG. 12) includes an opening (labeled as a "Fuel Outlet" in FIG. 12) through which the continuous phase (e.g., fuel) exits the coalescer element 1100 and the bottom endplate (labeled as a "Bottom endplate" in FIG. 12) includes an opening (labeled as a "Water Outlet" in FIG. 12) through which the dispersed phase (e.g., water) exits the coalescer element 1100. The coalescer element 1100 also includes a lip seal (labeled as a "Lip Seal" in FIG. 12) positioned along an annular recess on the bottom endplate. In arrangements where the coalescer element 1100 is modified for oil-water separation or any application where the dispersed phase is less dense than the continuous phase, a particular orientation is rotated one-hundred and eighty (180) degrees with respect to FIG. 11 such that the perforations 114 are near the upper endplate (with respect to gravity) and dispersed phase, removed from the top and continuous phase outlet is at the bottom. In some arrangements, the final layer of filter media in the non-pleated cylinder is perforated.

Figure 13:
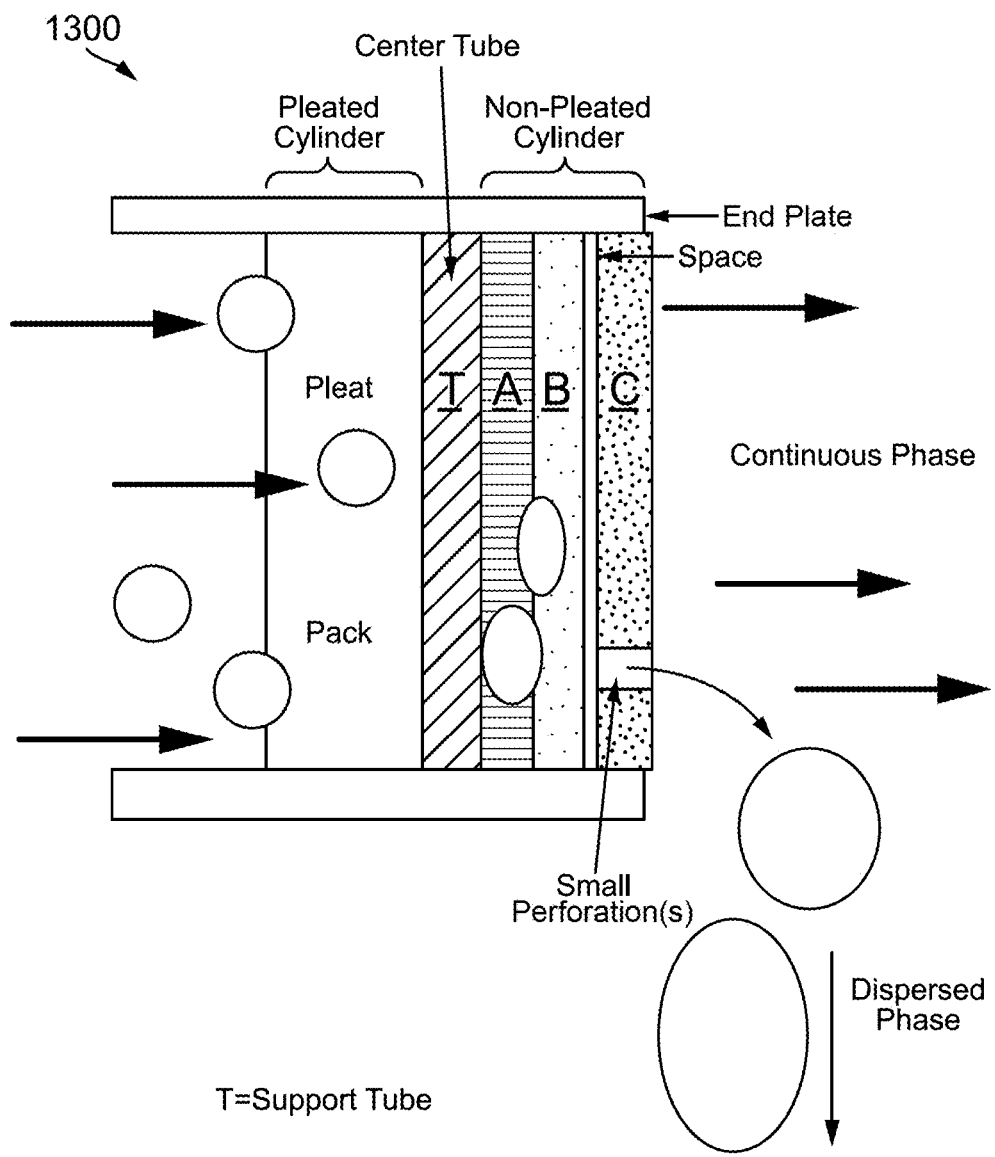
FIG. 13 shows a cross-sectional view of a coalescer element for a FWS system according to another example embodiment.

Referring to FIG. 13, a cross-sectional view of a coalescer element 1300 for a FWS system is shown according to an example embodiment. The coalescer element 1300 is similar to the coalescer element 1100, except that the center tube (T) is placed between the pleated filter media and the non-pleated cylinder (as opposed to the coalescer element 1100 where the non-pleated cylinder is located radially inward from the center tube). The center tube (T) includes the perforations 114 and is not a solid tube. Additionally, in some arrangements, the coalescer element 1300 does not include the inner filter element as included in the coalescer element 1100. In other arrangements, the coalescer element 1300 includes an inner element to provide additional separation.

In the arrangement of FIG. 13, flow goes from left to right passing first through a pleated cylinder of filter media, then through the center tube, and finally through three media layers of a non-pleated cylinder where droplets coalesce and drain before being released through the perforations 114 ("Small Perforation(s)" in FIG. 13) in the perforated layers. In the coalescer element 1300, the center tube is located between the pleated and non-pleated cylinders. It should be noted that the center tube may alternatively be located downstream, radially inwards, from the non-pleated cylinder, similar to the coalescer element 1100, however, in the arrangement shown in FIG. 13 the perforated layer is not compressed against the center tube in operation, captured water is able to drain more freely and water removal efficiency is improved. In some arrangements, the flow of filtered fuel then goes to the component (e.g., fuel injectors, internal combustion engine, etc.), while enlarged water drops settle out upon release from the perforated layer(s) of the inner filter element.

The first layer (A) may be relatively stiff so as to form a tube shape when bonded to the perforated layers (B and C). The perforated layer (C) has a first end (e.g., bottom end) that includes at least one perforation 114 at a location where the dispersed phase collects due to buoyancy and is drained and a second end (e.g., top end) proximate to which the clean continuous phase outlet of a corresponding filtration system is located, away from the perforations 114, thereby maintaining a low velocity region near the perforations 114 and preventing breakup of the coalesced dispersed phase.

In an example embodiment, the perforated layer (C) is relatively loosely fit on the perforated layer (B) such that wrinkles or small pleats form on the perforated layer (C). These wrinkles or small pleats assist the perforations 114 in drainage of the dispersed phase. In these embodiments, the perforated layer (C) is not continuously bonded to the perforated layer (B). This configuration may cause gaps (e.g., non-uniform gaps, etc.) to be formed between the perforated layer (C) and the perforated layer (B) even if a portion of the perforated layer (C) is in contact with a portion of the perforated layer (B). For example, the layers (A, B, C) may only be bonded along a top edge and/or a bottom edge to hold the layers (A, B, C) together during assembly. For example, a top edge of the layers (A, B, C) may be partially encased in potting compound (e.g., uncured potting compound, etc.) or embedded into an endplate during assembly. In these applications, portions of the layers (A, B, C) are free and capable of moving with respect to adjacent layers (A, B, C) and portions of the layers (A, B, C) are potted or partially encased on potting compound. In other applications, the layers (A, B, C) are bonded via vertical bonding strips. For example, the layers (A, B, C) may be bonded via four vertical bonding strips, each vertical bonding strip disposed along the coalescer element 1300 and angularly offset by ninety degrees relative to two other vertical bonding strips such that the vertical bonding strips are circumferentially disposed about the coalescer element 1300. This arrangement is advantageous because the layers (A, B, C) may selectively expand between the vertical bonding strips, thereby facilitating separation of the layers (A, B, C) and drainage of the dispersed phase from between the layers (A, B, C) towards the perforations 114.

Depending on the application, the inner-most perforated layer (C) may have a permeability of greater than one-hundred cubic feet per minute, greater than one-hundred and seventy cubic feet per minute, or greater than three-hundred cubic feet per minute. To achieve a permeability of greater than three-hundred cubic feet per minute, the inner-most perforated layer (C) could be constructed from, for example, mono-filament woven screen (e.g., using polyester fibers, using nylon fibers, etc.).

Figure 14:
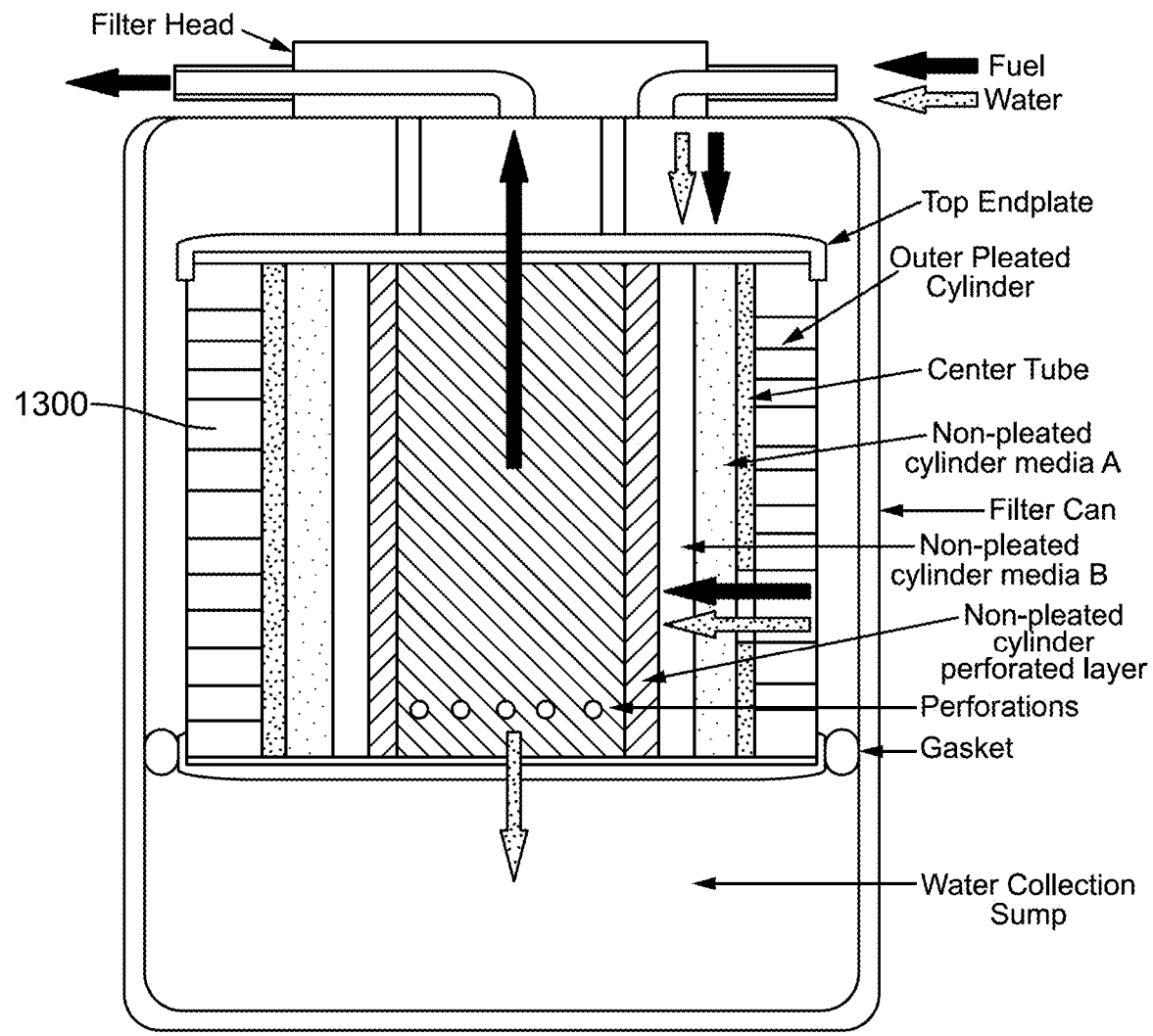
FIG. 14 shows a cross-sectional view of the coalescer element of FIG. 13 installed in a FWS system as a spin-on element.

Referring to FIG. 14, a cross-sectional view of the coalescer element 1300 installed in a FWS as a spin-on element within a filter can (labeled as a "Filter Can" in FIG. 14) is shown according to an example embodiment. In the arrangement of FIG. 14, flow occurs radially, from outside of the cylindrical filter element to inside the cylindrical filter element. Both the top and the bottom endplate of the coalescer element 1300 are open endplates (e.g., include holes, etc.). The top endplate provides a channel for substantially water-free fuel to leave the FWS and go to the component through a filter head (labeled as a "Filter Head" in FIG. 14). The top endplate also receives a mixture of fuel and water from the filter head (Filter Head) into the channel. The bottom endplate is open to provide access for settling water drops to reach the collection sump. A gasket (labeled as a "Gasket" in FIG. 14) is used to separate wet and dry fuel sides of the FWS. Through elimination of the inner element, gaskets interfacing with the inner element, support tube, etc., the coalescer element 1300 simplifies construction of the coalescer system without loss of performance (e.g., water removal efficiency, etc.) compared to the coalescer element 1100.

In side-by-side fuel water separation tests under identical conditions, a coalescer element 1300 of the type shown in FIGS. 13 and 14 (e.g., with perforated layer, center tube radially outward of non-pleated cylinder, perforated layer perforation pattern as shown if FIG. 8C, and no inner element) yielded ninety-one percent (91%) water removal efficiency, while a reference coalescer with inner element (the same type described relative to FIG. 10) lacking perforated layer yielded eighty-nine percent (89%) efficiency. Statistically, there was no difference in performance between the coalescer element 1100 and the coalescer element 1300 despite the simplified arrangement of the coalescer element 1300.

Figure 15:
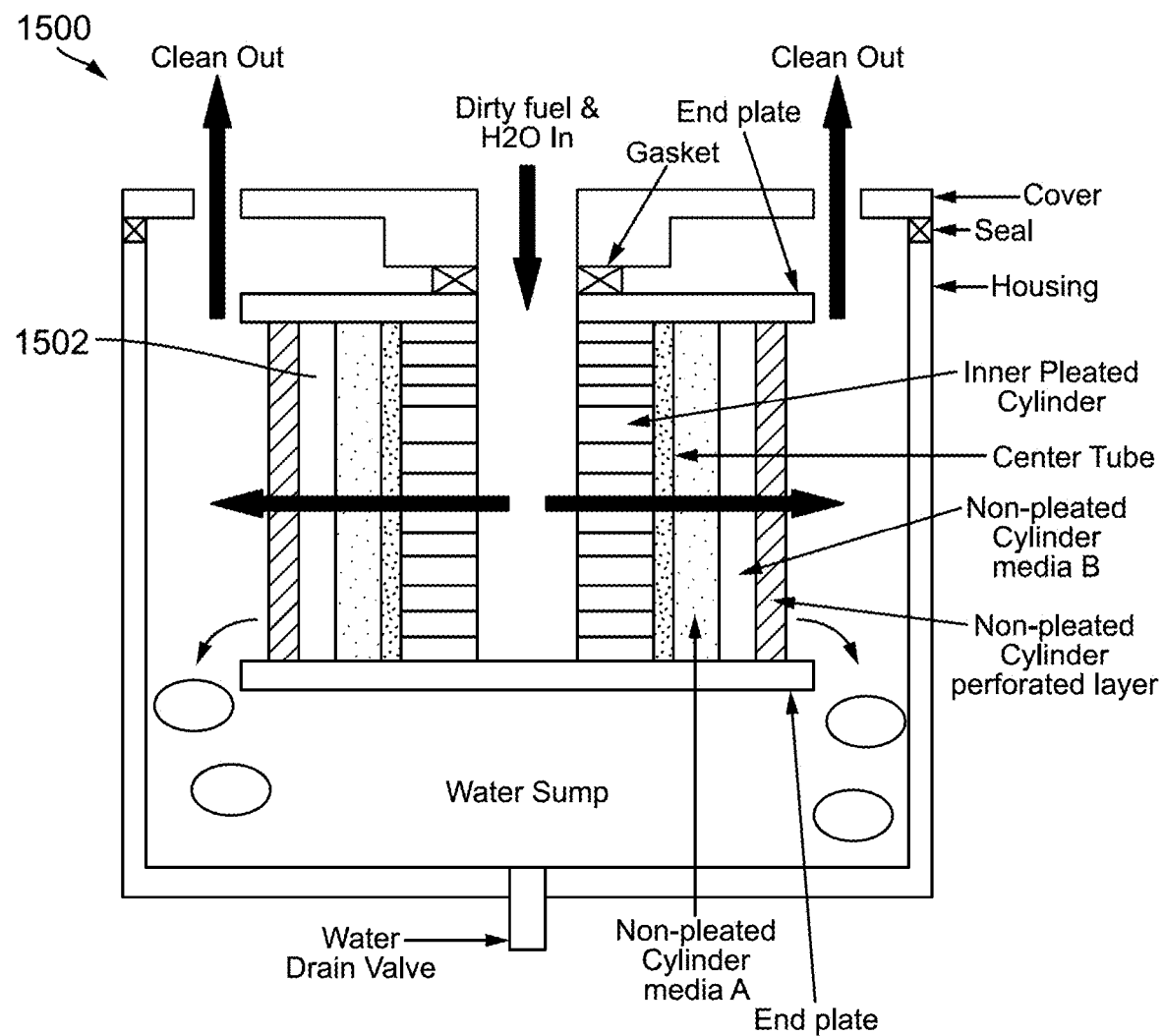
FIG. 15 shows a cross-sectional view a FWS system having an inside-out coalescer element according to an example embodiment.

Referring to FIG. 15, a cross-sectional view a FWS 1500 having an inside-out coalescer element 1502 is shown according to an example embodiment. The top endplate of the coalescer element 1502 seals to the housing or filter head with a gasket. A radial seal (labeled as a "Gasket" in FIG. 15) may maintain seal integrity even if the element moves downwards slightly under conditions of high differential pressure, such as when the coalescer element 1502 is plugged or cold start conditions. In an alternate arrangement, an axial or compression seal is used instead of the radial seal and is designed to maintain adequate seal compression under worst case pressure drop conditions (e.g., cold start conditions, when the coalescer element is plugged, etc.). The housing (labeled as a "Housing" in FIG. 15) of the FWS 1500 defines an internal volume within which the coalescer element 1502 is positioned.

Because of the inside-out nature of the coalescer element 1502, a bottom seal, similar to the gasket of the coalescer element 1300 shown in FIG. 14, is not required. This arrangement of the coalescer element 1502 eliminates a potential bypass point thereby facilitating use of the coalescer element 1502 in applications where high water removal efficiency is critical. Furthermore, this arrangement of the coalescer element 1502 provides a reduction in cost because a separate gasket and/or screen structure are not required. The coalescer element 1502 also may include more media (e.g., thirty percent more media, etc.) than the coalescer element 1300, and therefore may have a longer filter life and provide a greater water removal efficiency than the coalescer element 1300.

As shown, water laden fuel (labeled as "Dirty fuel & H2O In" in FIG. 15) enters the coalescer element 1502 through an opening (e.g., aperture, etc.) in the center of the top endplate and flow radially outward through the coalescer element 1502. Alternatively, dirty fuel may enter the coalescer element 1502 through an open endplate (e.g., a bottom endplate with a perforation 114 in the center, etc.) in an in-line filter configuration of this embodiment.

The fuel flows first through the coalescer element's inner pleated cylinder. The inner pleated cylinder is designed to serve as the first stage of the coalescer element 1502, as well as, remove particles. In some arrangements, the arrangement of the inner pleated cylinder and the function of the inner pleated cylinder is similar to the arrangements described in U.S. Pat. No. 8,678,202. The fluid then passes through the supporting center tube, which also prevents the pleat pack from ballooning out as restriction builds. In some arrangements, the center tube is located between the non-pleated and pleated cylinders. In other arrangements, the center tube is located upstream of the pleated cylinder or downstream of the non-pleated cylinder.

The fluid then passes through the outer non-pleated cylinder. The non-pleated cylinder may be formed from a single-layer of perforated filter media or from several layers of filter media in which the final layer is a perforated layer. When multiple layers are used, individual layers are designed such that each provides increased coalescence and the droplets increase in size as they progress through the layers. Water drops captured at the perforated layer drain downward and accumulate and coalesce near the perforations 114 before passing through the perforations 114 and being released as enlarged drops. Clean, relatively water-free fuel flows upwards, through at least one opening in the cover of the FWS 1500, and to a component (e.g., a fuel pump, fuel injectors, an internal combustion engine, etc.).

The FWS 1500 may also be implemented as a spin-on filter where the housing attaches to a filter head rather than the cover. The FWS 1500 may also be implemented as a cartridge filter. In these embodiments, the mixture enters the FWS 1500 through an aperture in the housing or the filter head, not directly through the cover.

As shown in FIG. 15, the perforations 114 are located near the bottom of the coalescer element and release drops in a similar manner as described above with respect to FIG. 8C or 8E. Thus, the enlarged drops are released in a relative quiescent zone. As such, the drops of coalesced water are not subject to breakup by turbulence and readily settle into the water collection sump. The housing of the FWS 1500 causes a water sump to form below the coalescer element 1502 and includes an opening near the bottom of the housing through which the water is provided to a water drain valve (labeled as a "Water Drain Valve" in FIG. 15). From the water drain valve, the water may be provided to, for example, a reservoir or a sink (e.g., an exterior environment, etc.). The FWS 1500 provides superior water removal efficiency, as well as a simplified design with no need for an additional separator stage.

The perforations 114 are located in close proximity to the bottom endplate, but not so close that the perforations 114 are pinched closed by adjacent layers pressing against them. In some arrangements, the perforations 114 are placed between six and twelve millimeters from the endplate, with an optional second row of perforations 114, staggered between the first rows of perforations 114 (e.g., as shown in FIG. 7F). In some arrangements, both rows of perforations 114 are within the region between three and eighteen millimeters from the endplate. In other arrangements, perforations 114 are positioned in other locations, such as further from the endplate. In further arrangements, the perforations 114 are positioned at one third or one quarter of the height of the filter media from the endplate. However, the benefit of placing the perforations 114 within the lowest flow region of the continuous phase where the lowest flow region results in the largest released droplets, and results in optimal settling and water removal efficiency.

Figure 3:
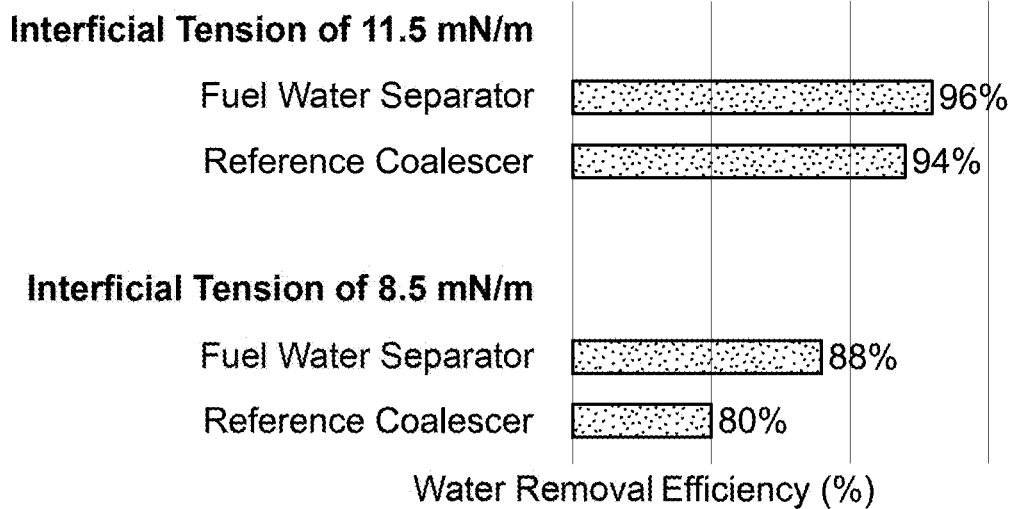
FIG. 3 illustrates a chart comparing the performance of the FWS of FIG. 15 with that of the unperforated reference coalescer.

FIG. 3 shows a chart comparing the water removal efficiencies of the FWS 1500, the "Fuel Water Separator," with that of the unperforated "Reference Coalescer" previously described using a modified SAE J1488 FWS test procedure. The procedure was modified in that the test was conducted using fuels with low interfacial tension. One fuel exhibited an interfacial tension of 11.5 dyne/cm and the other 8.5 dyne/cm. The standard SAE J1488 test is run using fuel with an interfacial tension between fifteen and nineteen dyne/cm. Under the standard test conditions, both filters exhibit water removal efficiencies of nearly one-hundred percent.

Under the more challenging conditions with low interfacial tension, the arrangement of FIG. 15 exhibited water removal efficiencies of ninety-six percent (96%) and eighty-eight percent (88%) for fuels with interfacial tensions of 11.5 and 8.5 dyne/cm, respectively. In contrast, the reference filter exhibited a water removal efficiency of only between ninety-four percent (94%) and eighty percent (80%) for the same fuels. The superior performance of the coalescer element 1502 is also obtained with a second separator stage and with no seal around the bottom endplate.

Figure 16A:
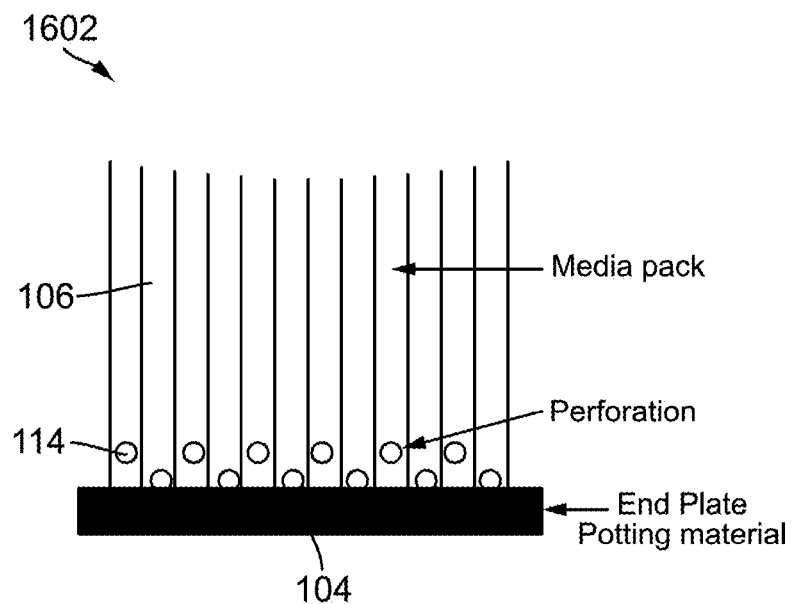
FIG. 16A shows a bottom portion of an embedded-style filter element according to an example embodiment.
Figure 16B:
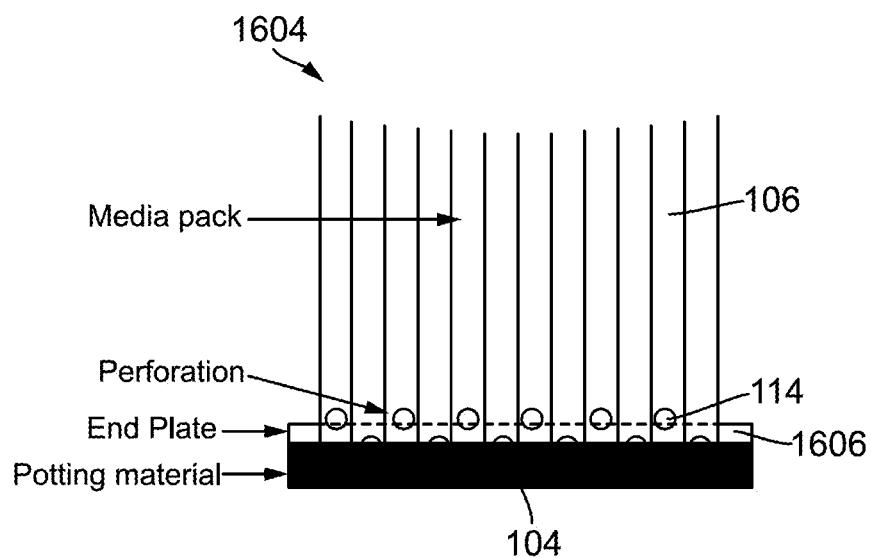
FIG. 16B shows illustrates a bottom portion of a potted-style filter element according to an example embodiment.

Referring to FIGS. 16A and 16B, in a filter element, the position of the perforations 114 (labeled as a "Perforation" in FIGS. 16A and 16B) relative to the end plate 104 and potting compound 1606 (labeled as "End Plate Potting material" in FIG. 16A) may affect removal of the dispersed phase 110 and coalescer performance. Filter elements typically consist of a filter media pack (labeled as a "Media pack" in FIGS. 16A and 16B) embedded in the end plate (such as a polyamide end plate) or potted and cured in a potting compound (e.g., polyurethane placed on a plastic or metal end plate). FIG. 16A illustrates the bottom portion of an embedded-style filter element 1602. FIG. 16B illustrates the bottom of a potted-style filter element 1604. Dispersed phase removal is greatest when the distance between the bottoms of lowest row of perforations 114 and the top of the potting compound 1606 or end plates is zero. For example, for flat end plates without an annular lip, such as embedded end plates, removal is greatest when the distance between the bottoms of lowest row of perforations 114 and the top of the end plates is zero or when the bottom row of perforations is partially (but not completely) embedded. Similarly, for end plates with an annular lip, such as in the case of filter elements with end plates that use a potting compound to attach the filter media pack to the end plate, removal is greatest when the distance between the bottoms of lowest row of perforations 114 and the top of the potting compound or end plate is zero. The annular lip may include at least one notch around the outer edge to allow the dispersed phase to drain from the end plate.

In some arrangements, the perforations 114 may be aligned with notches in the annular lip. In either case and for cylindrical filter elements, it is preferable that the diameter of the end plate or potting compound's upper surface be greater than or equal to the diameter of the filter media pack. In such arrangements, coalesced drops emerging from the perforated layer are supported by the upper surface of the potting compound (labeled as "Potting material" in FIG. 16B), end plate (labeled as "End Plate" in FIG. 16B) or water accumulating in the end plate cavity. As a result, the drops can grow larger since their mass is supported and gravity does not tear the forming drop away from the filter media. In one arrangement, the lowest row of perforations 114 is defined by a boundary condition such that the distance between perforations 114 is zero (i.e., there is a continuous or near continuous band between the top of the potting compound or end plate and the bottom edge of the perforated layer in which there is no media in this layer thereby creating a gap between a bottom end of the filter media of this layer and the endplate). The height of this gap ranges from the minimum to the maximum perforation diameter range previously noted.

While the filter element 106 has been variously described as including a layer of filter media having the perforations 114, it is understood that the filter element 106 may not include any of the perforations 114 in any layer. For example, the filter element 106 may be constructed from filter media having a target porosity that facilitates separation of the coalesced dispersed phase and the continuous phase. In these embodiments, the center tube may still include perforations or openings to facilitate the transfer of the coalesced dispersed phase and the continuous phase therethrough.

The above-described filter media, filter elements, and coalescer elements are described in relation to FWS. However, the same principles can be applied to other filtration systems that utilize coalescence to remove dispersed phase from a continuous phase (e.g., oil water separators or crankcase ventilation coalescer).

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A filter element comprising:
    a top endplate;
    a bottom endplate;
    a first filter media positioned between the top endplate and the bottom endplate, the first filter media being pleated;
    a second filter media positioned between the top endplate and the bottom endplate, the second filter media being non-perforated and non-pleated; and
    a third filter media positioned between the top endplate and the bottom endplate, the third filter media being non-pleated and comprising:
        a plurality of pores, and
        a perforation positioned proximate an edge of the third filter media, the perforation being larger than each of the pores, the perforation formed as a hole in the third filter media;
    wherein the second filter media is positioned between the first filter media and the third filter media.

2. The filter element of claim 1, further comprising a support positioned between the first filter media and the second filter media.

3. The filter element of claim 1, wherein:
    the first filter media surrounds the second filter media; and
    the second filter media surrounds the third filter media.

4. The filter element of claim 3, wherein:
    the first filter media is cylindrical;
    the second filter media is cylindrical; and
    the third filter media is cylindrical.

5. The filter element of claim 4, further comprising a support positioned between the first filter media and the second filter media.

6. The filter element of claim 1, further comprising a fourth filter media positioned between the second filter media and the third filter media, the fourth filter media being non-pleated and non-perforated.

7. The filter element of claim 6, further comprising a support positioned between the first filter media and the second filter media.

8. The filter element of claim 6, further comprising a support positioned between the first filter media and the second filter media.

9. The filter element of claim 8, wherein a first portion of the fourth filter media is separated from a first portion of the third filter media.

10. The filter element of claim 9, wherein a second portion of the fourth filter media is in contact with a second portion of the third filter media.

11. The filter element of claim 10, wherein the second portion of the fourth filter media is bonded with the second portion of the third filter media.

12. The filter element of claim 11, further comprising a support positioned between the first filter media and the second filter media.

13. The filter element of claim 1, wherein a first portion of the second filter media is separated from a first portion of the third filter media.

14. The filter element of claim 13, wherein a second portion of the second filter media is in contact with a second portion of the third filter media.

15. The filter element of claim 14, wherein the second portion of the second filter media is bonded with the second portion of the third filter media.

16. A method of filtering a fluid using a filter element, the method comprising:
- passing the fluid through a first filter media of the filter element, the first filter media positioned between a top endplate of the filter element and a bottom endplate of the filter element, the first filter media being pleated;
- passing the fluid through a second filter media of the filter element after passing the fluid through the first filter media, the second filter media positioned between the top endplate and the bottom endplate, the second filter media being non-perforated and non-pleated; and
- passing the fluid through a third filter media of the filter element after passing the fluid through the second filter media, the third filter media positioned between the top endplate and the bottom endplate, the third filter media being non-pleated and comprising a plurality of pores and a perforation positioned proximate an edge of the third filter media, the perforation being larger than each of the pores, the perforation formed as a hole in the third filter media.

17. The method of claim 16, further comprising providing, due to gravity, filtered fluid in a region of a housing between the second filter media and the third filter media that is adjacent to the perforation.

18. A method of filtering a fluid using a filter element, the method comprising:
- passing the fluid through a first filter media of the filter element, the first filter media positioned between a top endplate of the filter element and a bottom endplate of the filter element, the first filter media being non-pleated and comprising a plurality of pores and a perforation positioned proximate an edge of the first filter media, the perforation being larger than each of the pores, the perforation formed as a hole in the first filter media;
- passing the fluid through a second filter media of the filter element after passing the fluid through the first filter media, the second filter media positioned between the top endplate and the bottom endplate, the second filter media being non-perforated and non-pleated; and
- passing the fluid through a third filter media of the filter element after passing the fluid through the second filter media, the third filter media positioned between the top endplate and the bottom endplate, the third filter media being pleated;
- providing, due to gravity, filtered fluid in a region of a housing between the first filter media and the second filter media that is adjacent to the perforation.

* * * * *